(12) United States Patent
Cartellone

(10) Patent No.: US 6,616,722 B1
(45) Date of Patent: Sep. 9, 2003

(54) ROOM AIR CLEANER

(75) Inventor: Mark A. Cartellone, Broadview Heights, OH (US)

(73) Assignee: HMI Industries, Inc., Seven Hills, OH (US)

( * ) Notice: Subject to any disclaimer, the term of this patent is extended or adjusted under 35 U.S.C. 154(b) by 0 days.

(21) Appl. No.: 10/030,804

(22) PCT Filed: May 9, 2000

(86) PCT No.: PCT/US00/12723

§ 371 (c)(1),
(2), (4) Date: Jan. 11, 2002

(87) PCT Pub. No.: WO01/85303

PCT Pub. Date: Nov. 15, 2001

(51) Int. Cl.$^7$ ............................................. B01D 46/00
(52) U.S. Cl. .................... 55/459.3; 55/471; 55/473; 96/384
(58) Field of Search ..................... 55/276, 331, 333, 55/437, 459.3, 523, 473, 471, 467, 385.2; 96/384

(56) References Cited

U.S. PATENT DOCUMENTS

| | | |
|---|---|---|
| 1,921,085 A | 8/1933 | Korittke |
| 2,033,833 A | 3/1936 | Kent |
| 2,139,736 A | 12/1938 | Durham |
| 2,242,278 A | 5/1941 | Yonkers, Jr. |
| 2,308,682 A | 1/1943 | Fuge |
| 2,362,933 A | 11/1944 | Schaefer |
| 2,394,923 A | 2/1946 | Little |
| 2,608,268 A | 8/1952 | Gerber |
| 2,627,936 A | 2/1953 | Martinet |
| 2,627,937 A | 2/1953 | Martinet |
| 2,763,886 A | 9/1956 | Brown, Jr. et al. |
| 3,343,344 A | 9/1967 | Fairaizl et al. |
| 3,426,512 A | 2/1969 | Nesher |
| 3,498,032 A | 3/1970 | Scott |
| 3,500,517 A | 3/1970 | Dekker et al. |
| 3,545,181 A | 12/1970 | Young |
| 3,608,024 A | 9/1971 | Yazawa et al. |
| 3,616,624 A | 11/1971 | March |
| 3,724,181 A | 4/1973 | Benson, Jr. |
| 3,804,942 A | 4/1974 | Kato et al. |

(List continued on next page.)

FOREIGN PATENT DOCUMENTS

| | | |
|---|---|---|
| DE | 27 11 111 A1 | 9/1979 |
| DE | 42 40 172 A1 | 6/1994 |
| FR | 2 653 354 A1 | 4/1991 |
| JP | 2-187114 A2 | 7/1990 |
| JP | 4-197460 A2 | 7/1992 |
| JP | 8-66341 A2 | 3/1996 |
| JP | 11-309204 A2 | 11/1999 |

OTHER PUBLICATIONS

Article entitled *3M Brand Substrate Blown Microfiber Filter Media*, from brochure entitled *3M Filtration Products*, 1994.
International Search Report, dated Aug. 24, 2000.
International Preliminary Examination Report, dated Jul. 16, 2001.

*Primary Examiner*—Duane Smith
*Assistant Examiner*—Minh-Chau T. Pham
(74) *Attorney, Agent, or Firm*—Fay, Sharpe, Fagan, Minnich & McKee

(57) ABSTRACT

A portable air cleaner designed to remove particles and unwanted gases from a room to provide for a healthier and cleaner environment. The portable air cleaner includes a high air volume circulating design and operates quietly and efficiently. The air exhaust of the air cleaner includes a plurality of arcuate vanes radiating outwardly from the interior of the air cleaner. The vanes are disposed in a non-symmetrical arrangement the air exhaust to reduce pressure drop and to minimize operation noise.

79 Claims, 9 Drawing Sheets

U.S. PATENT DOCUMENTS

| | | |
|---|---|---|
| 3,853,512 A | 12/1974 | Hayashi |
| 3,870,495 A | 3/1975 | Dixson et al. |
| 3,925,043 A | 12/1975 | Matrone et al. |
| 3,953,184 A | 4/1976 | Stockford et al. |
| 3,966,597 A | 6/1976 | Omori et al. |
| 3,998,916 A | 12/1976 | van Turnhout |
| 4,121,916 A | 10/1978 | Fricke |
| 4,229,193 A | 10/1980 | Miller |
| 4,339,250 A | 7/1982 | Thut |
| 4,365,980 A | 12/1982 | Culbert et al. |
| 4,374,888 A | 2/1983 | Bornslaeger |
| 4,377,399 A | 3/1983 | Bryson |
| 4,378,234 A | 3/1983 | Suzuki et al. |
| 4,385,911 A | 5/1983 | Popeil et al. |
| 4,477,270 A | 10/1984 | Tauch |
| 4,504,290 A | 3/1985 | Pontius |
| 4,507,819 A | 4/1985 | Martinec |
| 4,514,197 A | 4/1985 | Armbruster |
| 4,531,956 A | 7/1985 | Howorth |
| 4,627,862 A | 12/1986 | Frei et al. |
| 4,629,482 A | 12/1986 | Davis |
| 4,650,505 A | 3/1987 | Magdelain |
| 4,687,579 A | 8/1987 | Bergman |
| 4,687,697 A | 8/1987 | Cambo et al. |
| 4,702,753 A | 10/1987 | Kowalczyk |
| 4,737,173 A | 4/1988 | Kudirka et al. |
| 4,749,390 A | 6/1988 | Burnett et al. |
| 4,750,924 A | 6/1988 | Potter |
| 4,784,676 A | 11/1988 | Hale |
| 4,810,269 A | 3/1989 | Stackhouse et al. |
| 4,874,659 A | 10/1989 | Ando et al. |
| 4,886,527 A | 12/1989 | Föttinger et al. |
| 4,900,344 A | 2/1990 | Lansing |
| 4,900,437 A | 2/1990 | Savall |
| 4,902,306 A | 2/1990 | Burnett et al. |
| 4,904,343 A | 2/1990 | Giglia et al. |
| 4,909,815 A | 3/1990 | Meyer |
| 4,917,942 A | 4/1990 | Winters |
| 4,921,510 A | 5/1990 | Plooy |
| 4,927,437 A | 5/1990 | Richerson |
| 5,037,455 A | 8/1991 | Scheineson et al. |
| 5,108,470 A | 4/1992 | Pick |
| 5,141,706 A | 8/1992 | Clark |
| 5,188,646 A | 2/1993 | Nolen, Jr. |
| 5,221,573 A | 6/1993 | Baigas, Jr. |
| 5,240,478 A | 8/1993 | Messina |
| 5,248,323 A | 9/1993 | Stevenson |
| 5,287,591 A | 2/1994 | Rench et al. |
| 5,288,298 A | 2/1994 | Aston |
| 5,290,330 A | 3/1994 | Tepper et al. |
| 5,306,534 A | 4/1994 | Bosses |
| 5,307,538 A | 5/1994 | Rench et al. |
| 5,350,443 A | 9/1994 | von Blücher et al. |
| 5,350,620 A | 9/1994 | Sundet et al. |
| 5,358,443 A | 10/1994 | Mitchell et al. |
| 5,399,319 A | 3/1995 | Schoenberger et al. |
| 5,435,817 A | 7/1995 | Davis et al. |
| 5,443,625 A | 8/1995 | Schaffhausen |
| 5,478,377 A | 12/1995 | Scavnicky et al. |
| 5,498,272 A | 3/1996 | Leon |
| 5,515,573 A | 5/1996 | Frey |
| 5,593,479 A | 1/1997 | Frey et al. |
| 5,603,741 A | 2/1997 | Frey |
| 5,641,343 A | 6/1997 | Frey |
| 5,647,881 A | 7/1997 | Zhang et al. |
| 5,651,811 A | 7/1997 | Frey et al. |
| 5,658,362 A | 8/1997 | Frey |
| 5,837,020 A | 11/1998 | Cartellone |
| 5,840,103 A | 11/1998 | Dyson |
| 5,874,052 A | 2/1999 | Holland |
| 5,931,991 A | 8/1999 | Leon |
| 6,003,196 A | 12/1999 | Wright et al. |
| 6,010,550 A | 1/2000 | Song |
| 6,090,184 A | 7/2000 | Cartellone |
| 6,197,096 B1 | 3/2001 | Cartellone |
| 6,243,915 B1 | 6/2001 | Nakai et al. |

ROOM AIR CLEANER

INCORPORATION BY REFERENCE

U.S. Pat. Nos. 5,248,323; 5,515,573; 5,593,479; 5,603,741; 5,641,343; 5,651,811; 5,658,362; and 5,837,020 are incorporated herein to illustrate the type of vacuum cleaner and/or air cleaner and the type of filter system in which the present invention can be used, and to preclude the necessity of repeating structural details relating to such filter systems, vacuum cleaners and air cleaners.

The present invention relates to the art of air filter systems and more particularly to a high efficiency, low noise, portable room air cleaner. The invention is particularly applicable to a portable canister type air cleaner and will be described with particular reference thereto; however, the invention has much broader applications and may be used in vacuum cleaners and/or to filter air in other environments by employing the novel air filtering arrangement as contemplated in the present invention.

BACKGROUND OF THE INVENTION

As more and more people move to urban environments, there is an ever increasing need to provide a clean air environment at home and in the work place. In urban areas, where pollution levels sometimes exceed maximum values set by the EPA, the need for a clean air environment becomes even more apparent. In view of the posed hazards these polluted environments create, the public has demanded a means for removing pollutants from the environment to provide a healthy environment for both living and working. Furthermore, many of these particles in the air can act as irritants and/or increase or aggravate a person's allergies. Airborn pollutants can also contribute to respiratory infections and illnesses which can be hazardous to individuals with respiratory problems. Particles in the air can create problems such as burning eyes, nose and throat irritation, contributing to headaches and dizziness, which can result in coughing and sneezing. Furthermore, these particles can include various types of spores, dust mites, microorganisms, such as bacteria and/or viruses, and/or other types of harmful particles which may cause serious illness or infection to a person.

In an effort to reduce the number of particles from the air and/or other environments, many homes, offices, and buildings have incorporated a central filtering system to remove particles entrained in the air. Unfortunately, these systems are very expensive and/or do not remove many of the small particles which can be the most hazardous and irritable to persons, such as spores, micro-organisms, such as bacteria and/or viruses, dust mites and some harmful chemicals. Typically, these filtering systems only remove about 300,000 particles out of about 20 million particles which flow into the filter medium. The small particles, which make up a majority of the particles in the air, freely pass through these conventional filter systems.

Specialized filters have been developed to remove many of the small particles in the air. Such filters are known as HEPA filters, which stands for High Efficiency Particle Air Filters, which, by government standards, are filters with a minimum efficiency of 99.97%. The industry defines HEPA filters as those filters which are efficient in removing 99.97% the airborn particles the size of 0.3 micron or larger. Such filters are commonly used in ultra clean environments such as in a laboratory, in electronic and biologically clean rooms, in hospitals and the like. These filters have recently been incorporated in air filters for business and individual use.

In U.S. Pat. No. 4,629,482 a portable HEPA room air cleaner is disclosed. The air cleaner incorporates a cylindrical HEPA filter and the filter is mounted within the filter housing having an air discharge at its base. A centrifugal fan is incorporated in the housing to draw air through the filter and discharge air at the base of the housing. Due to the configuration of the air cleaner, it is necessary to space the base of the apparatus from the main housing. Such a configuration also requires that the apparatus be designed somewhat larger than some consumers may desire. The discharge of air at the base of the unit results in the recirculation of particles which have already settled on the floor. Such recirculation of settled particles can result in increased particle irritation. The air cleaner does not incorporate a gas filter to remove irritable or noxious gas from the air.

In U.S. Pat. No. 5,435,817, another type of portable HEPA room air cleaner is disclosed. This unit is cylindrical in shape and includes a base discharge. A centrifugal fan is used to draw air into the top of the unit and discharge filtered air at the base of the unit. The unit incorporates an outer deflector wall to radially discharge air at the bottom of the unit, such that the exhaust air is channeled generally circumferentially about the base of the unit. The discharged air at the base of the unit results in the redistribution of settled particles back into the air. The air cleaner is also absent any mechanism for removing unwanted gases in the air.

Assignee's U.S. Pat. No. 5,641,343 discloses an improved air cleaner design which discharges purified air near the top of the unit to reduce recirculation of settled particles. The air cleaner also incorporates an internal air flow design which reduces pressure drop through the air cleaner thereby improving the efficiencies of the air cleaner. The air filter further incorporates an improved filtering agent to remove more particles as compared to standard HEPA filters. The efficiencies of standard HEPA filters are all based upon 0.3 micron size particles. Historically, it was believed that particles about 0.3 micron in size were the most difficult to remove from the air. However, recent particle filtration testing has shown that particles the size of about 0.1 micron are the most difficult to remove from the air. Standard HEPA filters do not efficiently remove such small particles and allow such particles to freely pass through the filter medium. An analysis of these small particles has shown that the particles do not naturally fall out of the air, but instead remain entrained in the air by constantly bouncing off other particles in the air (i.e. Browning effect). These small particles have also been found to deviate from the air flow thus making such particles even more difficult to remove from the air. The improved particle filter used in U.S. Pat. No. 5,641,343 overcomes this particle filtration problem by incorporating a filter which can remove at least about 99.98% of particles about 0.1 micron in size. The filter system can also include a gas filter to remove unwanted gases from the filtered air.

Although Assignee's air filter disclosed in U.S. Pat. No. 5,641,343 greatly improves air purification technology, additional improvements in air purification efficiencies were still demanded. During the air purification process, the air intake section is preferably the largest surface area component of the air cleaner so as to maximize the size of the air filter and volume of air to be purified. However, when the air intake is enlarged, the air purification unit must be enlarged, since the reduction in size of the air exhaust will cause an increase in pressure drop and significant reductions in efficiencies. In order to overcome the increased pressure drop, larger motors must be used which are more costly, noisier and energy consuming. In addition to the noise caused by the increased motor size, the velocity of air through the smaller air exhaust region results in additional noise during operation. To address this problem, Assignee invented an improved air cleaner which is disclosed in U.S. Pat. No. 5,837,020. The air cleaner disclosed in U.S. Pat. No. 5,837,020 includes an air exhaust having a plurality of arcuate shaped vanes. The vanes all have the same shape and size and are symmetrically oriented about the air exhaust. The ends of each vane are spaced the same distance from the blower fan to effectively draw air from the blower fan. The drawn air is directed outwardly along the outwardly radiating arcuate vanes. The use of the arcuate vanes overcome the pressure drop problems associated with a smaller air exhaust region thereby allowing larger volumes of air to be expelled in a given surface area. As a result, the size of the air exhaust can be reduced, which in turn can reduce the size of the air cleaner. Furthermore, a larger motor does not need to be used for a smaller air exhaust, since comparable pressure drops are obtained, even though the vane design air exhaust occupies a smaller area than a mesh design air exhaust.

Although the air cleaner disclosed in U.S. Pat. No. 5,837,020 is a significant improvement over prior air cleaner designs, the air cleaner, in some instances, produces vibrational noises during operation. Much of this noise is attributed to the harmonics of the vanes as the filtered air is expelled through the vanes. Therefore, there is a need for an improved air exhaust design which incorporates the use of vanes having reduced vibration tendencies during the operation of the air cleaner.

SUMMARY OF THE INVENTION

The invention relates to compact portable room air cleaner and will be described with particular reference thereto; however, it will be appreciated that the air cleaner can be used in general industrial levels and in other environments, wherein it is desirable to remove very small particles and/or undesirable gases from the environment. In addition, the features of the room air cleaner can be incorporated into a vacuum cleaning system.

In accordance with the principal aspect of the present invention, there is provided a portable air cleaner which includes a housing having an inner chamber. The exterior of the housing includes an air exhaust and an air intake. In one embodiment, the air intake is located below the air exhaust. In one aspect of this embodiment, the air intake is located at or near the base of the air cleaner to draw air into the air cleaner at or near the base of the air cleaner. In another specific aspect of this embodiment, the air exhaust is located at or near the top of the air cleaner to expel filtered air at or near the top of the air cleaner. The air being drawn into the air cleaner at or near the housing base does not re-blow settled particles back into recirculation in the room. If any settled particles are disturbed, these particles are immediately drawn into the air cleaner and filtered out of the air. The air expelled by the air exhaust positioned at or near the top of the housing is distanced from the floor where settled particles exist, thus the expelled air causes little, if any, settled particles to be recirculated in the room. In another embodiment, the air intake and air exhaust are located about the complete peripheral edge of the housing so as to draw in and expel air essentially around the complete peripheral surface of the housing. This design of the air intake and air exhaust maximizes the surface area in which the air can be drawn in and expelled from the air cleaner. As a result, large volumes of air can be filtered by the air cleaner. Furthermore, the velocity of the air into and out of the air cleaner is reduced due to the large surface area of the air intake. The reduced velocity of the air into the air cleaner reduces problems of stirring settled particles near the air cleaner. The design of the air cleaner to both draw and expel air around the periphery of the housing also allows the air filter to be positioned in various places in a room without concern for blocking the air flow into the air intake or out of the air exhaust. In yet another embodiment, the surface area on the exterior of the housing for the air intake is greater than the surface area on the exterior of the housing for the air exhaust. In still another embodiment, the air exhaust includes a plurality of arcuate shaped vanes. In still yet another embodiment, the vanes are positioned in the air exhaust to minimize vibrational noise during the operation of the air cleaner. In a further embodiment, the vanes are positioned in the air exhaust to increase air efficiencies and reduce pressure drop during the operation of the air cleaner. In one aspect of this embodiment, the air exhaust includes a blade that causes filtered air to be expelled from the air cleaner. Each of the vanes in the air exhaust have an inner or leading end positioned closely adjacent to the periphery of the blade. The inner or leading end of the vane is spaced from the blade a distance to effectively draw filtered air from the blade. Once the filtered air is drawn from the blade, the filtered air is directed outwardly along the outwardly radiating arcuate vanes until expelled from the outer periphery of the air exhaust. In yet a further embodiment, the vanes are positioned in the air exhaust to reduce the amount of noise generated by the air cleaner during operation. Humans typically cannot hear sound that has a wave length of more than 20 KHz. The air exhaust, and more particularly, the vanes in the air exhaust are designed and/or arranged in the air exhaust to reduce the amount of sound generated during the operation of the air exhaust that has a wave length of less than about 20 KHz. In one aspect of this embodiment, the vanes in the air exhaust are designed and/or arranged in the air exhaust to reduce the amount of sound generated during the operation of the air exhaust that has a wave length of less than about 18 KHz.

In accordance with another aspect of the present invention, one or more vanes in the air exhaust are oriented, configured and/or designed differently from one or more adjacent vanes such that the harmonics of one or more vanes during the operation of the air cleaner is different. In one embodiment, one or more vanes in the air exhaust are not symmetrically oriented with respect to the periphery of the air exhaust. In one aspect of this embodiment, at least one vane has an outer or back end positioned at or close to the periphery of the air exhaust such that the outer or back end is spaced a different distance from the outer or back end of one or more adjacent vanes. In another aspect of this embodiment, the distance between the outer or back end of the adjacent positioned vanes progressively increases. In one particular design of this aspect of this embodiment, the air exhaust includes four vanes. The periphery of the air exhaust is substantially circular. The progressively increased spacing of the outer or back ends of the adjacently positioned vanes is 81.75°, 89.75°, 92.75° and 95.75°. As can be appreciated, other angles of separation can be used. By having one or more vanes being not symmetrically oriented with respect to the periphery of the air exhaust, the harmonics of two or more vanes are different during operation, thereby interfering with an additive vibrational effect. As a result, the amount of vibration of the vanes during the operation of the air cleaner is significantly reduced, thereby reducing the vibrational noise during operation of the air cleaner. In addition, the air pressure between differently positioned vanes varies during the operation of the air cleaner. It has been found that this variable air pressure increases the efficiency of filtered air being expelled by the air cleaner and also results in reduced pressure drop. In another embodiment, one or more vanes in the air exhaust are not symmetrically oriented about the blade in the air exhaust. In one aspect of this embodiment, at least one vane has an inner or leading end positioned about the blade such that the inner or leading end is spaced a different distance from the inner or leading end of one or more adjacent vanes. In another aspect of this embodiment, the inner or leading end of the adjacently positioned vanes progressively increases. In one particular design of this aspect of this embodiment, the air exhaust includes four vanes. The blade in the air exhaust is substantially circular. The progressively increased spacing of the inner or leading ends of the adjacently positioned vanes is 81.75°, 89.75°, 92.75° and 95.75°. As can be appreciated, other angles of separation can be used. By having one or more of the inner or leading ends of the adjacent vanes positioned at different distances with respect to one another, the harmonics of two or more vanes are different during operation thereby reducing the amount of vibration of the vanes during operation, reducing the amount of vibrational noise during operation, reducing the pressure drop through the room cleaner, and increasing the air filtering efficiencies of the room cleaner. In still another embodiment, the width of the inner or leading end of at least one vane is different from the width of the inner or leading end of one or more adjacent vanes. By having the different widths of one or more of the inner or leading ends of adjacent vanes, the harmonics of two or more vanes are different during operation thereby reducing the amount of vibration of the vanes during operation, reducing the amount of vibrational noise during operation, reducing the pressure drop through the room cleaner, and increasing the air filtering efficiencies of the room cleaner. In still yet another embodiment, the distance of the inner or leading end of at least one vane from the blade is different from the distance of the inner or leading end of one or more adjacent vanes from the blade. In one aspect of this embodiment, the inner or leading end of each vane is spaced within about one inch of the blade. Typically, the inner or leading end of each vane is spaced about 0.05–0.4 inch from the blade. By having the different distances of one or more of the inner or leading ends of adjacent vanes from the blade, the harmonics of two or more vanes are different during operation thereby reducing the amount of vibration of the vanes during operation, reducing the amount of vibrational noise during operation, reducing the pressure drop through the room cleaner, and increasing the air filtering efficiencies of the room cleaner. In a further embodiment, the radius of curvature of at least a portion of one or more vanes is different from the radius of curvature of at least a portion of one or more adjacent vanes. By having the radius of curvature of at least a portion of one or more vanes different from the radius of curvature of one or more adjacent vanes, the harmonics of two or more vanes are different during operation, thereby reducing the amount of vibration of the vanes during operation, reducing the amount of vibrational noise during operation, reducing the pressure drop through the room cleaner, and increasing the air filtering efficiencies of the room cleaner. In yet further embodiment, at least one vane has a different length from at least one or more adjacent vanes. By having a length of one or more vanes different from the length of one or more adjacent vanes, the harmonics of two or more vanes are different during operation, thereby reducing the amount of vibration of the vanes during operation, reducing the amount of vibrational noise during operation, reducing the pressure drop through the room cleaner, and increasing the air filtering efficiencies of the room cleaner. In still a further embodiment, the inner or leading end of one or more vanes is sloped differently from the inner or leading end of one or more adjacent vanes. The sloped surface of the inner or leading end of one or more vanes performs several functions such as reducing air noise and increasing the efficiency by which the air is drawn from the blade. As the inner or leading end of a vane is positioned closer to the blade of the blower fan, more air is drawn away from the blade by the vane. The increased amount of drawn air from the blade increases the efficiency to which the blower fan draws air into the air cleaner and expels the filtered air. However, the closer the leading end of the vane is positioned to the blade during operation, the louder the air cleaner operates. The increased noise levels are caused by the high velocity air contacting the inner or leading end of the vane and causing a whistling sound. In addition, the high velocity air can cause the vane to vibrate which also results in noise. The vibration and whistling is reduced or significantly eliminated by increasing the space of the inner or leading end of the vane from the blade. However, increasing of the spacing of the vane inner or leading end from the blade reduces the efficiency at which the air is drawn from the blade, thus reducing the amount of air drawn into the air cleaner. By sloping the inner or leading end of the vane, the amount of whistling noise and vibration of the vane is significantly reduced when the inner or leading end of the vane is positioned close to the blade. As a result, the inner or leading end can be placed closer to the blade to increase air withdrawal efficiencies without increasing operation noise. The use of a sloped surface vane as compared to a straight surface vane has also been found to more efficiently draw air from the blade during operation of the air cleaner, thus further increasing the efficiencies of operation. In one aspect of this embodiment, the sloped inner or leading end of at least one vane slopes from the top to the bottom of the vane. In another aspect of this embodiment, the inner or leading end of at least one vane slopes from the bottom to the top of the vane. In still another aspect of this embodiment, the sloped angle of the inner or leading end of the vane is about 10–75°. In operation, the sloped angle is typically about 20–40°. In yet another aspect of this embodiment, the sloped surface is a linear or straight surface. In still yet another aspect of this embodiment, the sloped surface is an arcuate or curved surface. In still a further aspect of this embodiment, the angle of slope of the inner or leading end of at least one vane is different from the angle of slope of the inner or leading end of one or more adjacent vanes. By having different angles of slope of one or more of the inner or leading ends of adjacent vanes, the harmonics of two or more vanes are different during operation thereby reducing the amount of vibration of the vanes during operation, reducing the amount of vibrational noise during operation, reducing the pressure drop through the room cleaner, and increasing the air filtering efficiencies of the room cleaner. In yet a further aspect of this embodiment, the length of the sloped region of the inner or leading end of at least one vane is different from the length of the sloped region of the inner or leading end of one or more adjacent vanes. By having different lengths of sloped regions of one or more of the inner or leading ends of adjacent vanes, the harmonics of two or more vanes are different during operation thereby reducing the amount of vibration of the vanes during operation, reducing the amount of vibrational noise during operation, reducing the pressure drop through the room cleaner, and increasing the air filtering efficiencies of the room cleaner. In still a further embodiment, the rigidity profile of at least one vane is different from the rigidity profile of one or more adjacent vanes. In one aspect of this embodiment, the rigidity of one or more vanes is altered by increasing or decreasing the thickness of the vane over at least a portion of the vane. The differing vane thickness will cause the vane to vibrate differently from other vanes as filtered air passes through the vanes during operation of the air cleaner. In another aspect of this embodiment, the rigidity of one or more vanes is altered by changing the composition of the vane over at least a portion of the vane. The differing vane composition will cause the vane to vibrate differently from other vanes as filtered air passes through the vanes during operation of the air cleaner. By having different rigidity profiles of one or more adjacent vanes, the harmonics of two or more vanes are different during operation thereby reducing the amount of vibration of the vanes during operation, reducing the amount of vibrational noise during operation, reducing the pressure drop through the room cleaner, and increasing the air filtering efficiencies of the room cleaner. In still yet a further embodiment, the inner or leading end of the vane has a tapered edge. The tapered edge further reduces operation noise and increases air withdrawal efficiencies from the blower fan. In one aspect of this embodiment, the inner or leading end of at least one vane has a tapered edge and the inner or leading end of at least one vane does not have a tapered edge. By having one or move vanes with tapered edges and one or more vanes without tapered edges, the harmonics of two or more vanes are different during operation, thereby reducing the amount of vibration of the vanes during operation, reducing the amount of vibrational noise during operation, reducing the pressure drop through the room cleaner, and increasing the air filtering efficiencies of the room cleaner. In another aspect of this embodiment, the thickness of the tapered edge of an inner or leading end of at least one vane is different from the thickness of a tapered edge of an inner or leading end of at least one vane. By having one or more vanes with tapered edges of differing thicknesses, the harmonics of two or more vanes are different during operation, thereby reducing the amount of vibration of the vanes during operation, reducing the amount of vibrational noise during operation, reducing the pressure drop through the room cleaner, and increasing the air filtering efficiencies of the room cleaner. As can be appreciated with respect to these embodiments and aspects of these embodiments, two or more combinations of these embodiments and aspects of these embodiments can be used in the air cleaner to reduce the vibrational noise and increase the air efficiencies during operation of the air cleaner.

In yet another aspect of the present invention, the use of a mesh screen about the outer periphery of the air exhaust can be eliminated. The use of a typical mesh type screen causes a significant pressure drop as the filtered air passes through the multitude of openings in the screen. The elimination of the use of a traditional mesh design and the use of the new vane design overcomes the pressure drop problems, thereby allowing larger volumes of air to be expelled in a given surface area. Therefore, a smaller size air exhaust can be used for a given pressure drop and volume of air expulsion as compared to a mesh screen air exhaust design. As a result, the size of the air exhaust can be reduced, which in turn can reduce the size of the air cleaner. Furthermore, a larger motor does not need to be used for a smaller air exhaust since comparable pressure drops are obtained even though the air exhaust occupies a smaller area than an air exhaust which includes a screen.

In accordance with a further aspect of the present invention, the air exhaust includes one or more air guides positioned between two or more vanes. The air guides assist in distributing the filtered air as it is expelled from the air cleaner, thereby reducing the air velocity from the air cleaner via a diffusion effect. The filtered air leaving the air exhaust may be expelled in a jet stream matter. The air guide assists in breaking up this jet stream so the air exits the air exhaust more evenly. The reduction or prevention of the jet stream air flow tendency reduces the amount of settled particles which are stirred up as the air exits the air exhaust. The air guide also can function to limit the access between the vanes. The air guide can also reduce vibrational and/or whistling noises caused by a jet stream thereby making the air cleaner quieter during operation. In one aspect of this embodiment, the air guides are substantially symmetrically oriented to one another. In another aspect of this embodiment, the air guides are not symmetrically oriented to one another. The non-symmetrical orientation of the air guides can reduce the amount of vibrational noise during the operation of the air cleaner.

In accordance with yet a further aspect of the present invention, the motor mechanism of the air cleaner is located within the housing to draw air through the air intake, through one or more filters, into the inner chamber of the housing and to expel the filtered air out through the air exhaust. In one embodiment, the motor mechanism includes an electric motor which drives a blade that creates a vacuum in the inner chamber of the housing which results in air being drawn into the air intake and through the one or more air filters. In another embodiment, a particle filter is disposed between the air intake and inner chamber of the air cleaner to remove a wide variety of particles entrained in the air. In one aspect of this embodiment, the particle filter is a filter which removes at least about 99.97% of the particles entrained in the air having a size greater than about 0.3 micron. In another aspect of this embodiment, the particle filter is a filter which removes at least about 99.98% of the particles entrained in the air having a size greater than about 0.1 micron. In yet another aspect of this embodiment, the particle filter can be made of one or more filter layers. In one arrangement of this aspect of this embodiment, the particle filter is a single filter made of multiple filter layers. In another arrangement of this aspect of this embodiment, the particle filter is a plurality of single layer filters. In yet another arrangement of this aspect of this embodiment, the particle filter is a plurality of filters, which filters are single layer filters and/or multiple layer filters. In still another aspect of this embodiment, the filter removes particles from the air mechanically and/or by electrical attraction. The composition of the filter typically includes the composition of the filters disclosed in Assignee's U.S. Pat. Nos. 5,248,323; 5,593,479; 5,641,343; 5,651,811; 5,837,020 and Assignee's U.S. patent application Ser. No. 09/032,589 filed Feb. 27, 1998, which are incorporated herein by reference.

In accordance with still a further aspect of the present invention, a gas filter is used in combination with the particle filter in the air cleaner to remove gases such as smoke, fumes, gas contaminants, and/or noxious gases from the filtered air. In one embodiment, the gas filter is positioned adjacent to the particle filter. In another embodiment, the gas filter is connected to and/or forms a part of the particle filter. In still another embodiment, the gas filter includes activated charcoal to absorb one or more gases from the filtered air. In one aspect of this embodiment, the gas filter is formed of non-woven activated charcoal matting. One type of non-woven material that can be used is a non-woven polyester material impregnated with activated carbon. In another aspect of this embodiment, the mat has a thickness of up to about 1.0 inch. In still another aspect of this embodiment, the mat has a sponge texture to increase the surface area of the activated carbon.

In accordance with still yet a further aspect of the present invention, one or more filters in the air cleaner are cylindrical in shape to increase the surface area to provide increased filtering efficiencies. In one embodiment, the particle filter is cylindrical in shape. In another embodiment, the gas filter is cylindrical in shape. In still another embodiment, the particle filter and the gas filter are positioned adjacent to one another thereby minimizing the area taken up by the filters and to ensure that the filters are properly positioned in the air cleaning system.

In accordance with another aspect of the present invention, a support mechanism is employed to maintain the particle filter and/or the gas filter in a proper position and to support the particle filter and/or gas filter during the filtration of the air. The support mechanism can be incorporated into the filters themselves and/or can be an external mechanism such as a frame to hold the particle filter and/or gas filter in place. The support mechanism is designed to support and maintain the particle filter and/or gas filter in position without impairing the air flow through the particle filter and/or gas filter.

In accordance with still another aspect of the present invention, the air filters in the air cleaner do not cause a large pressure drop as the air passes through the filter system. The fibers in the particle filter are designed to mechanically trap and/or electrically attract particles entrained in the air as they pass through the filter so as not to impair the air flow through the air filters. Furthermore, the other components of the air cleaner are designed to minimize pressure drop through the air cleaner. As a result, the air cleaner can use a smaller motor so that the air cleaner can have a more compact and portable design.

The primary object of the present invention is the provision of an air cleaner which can efficiently and effectively filter out particles entrained in the air.

Another object of the present invention is the provision of an air cleaner designed to have a large volume of air intake and a large volume of air exhaust with relatively low air velocity into and out of the air cleaner.

Yet another object of the present invention is the provision that the filter element in the air cleaner can be easily changed when the filter becomes clogged or partially clogged, or old.

Still a further object of the present invention is an air cleaner which includes using a particle filter in combination with a gas filter to remove both particles and unwanted gases from the air.

In accordance with another object of the present invention, the particle filter and the gas filter are disposed in a coterminous relationship to one another and supported by a support structure.

In accordance with another object of the present invention, the air cleaner is designed to minimize the air pressure drop throughout the air cleaner thereby reducing the need for a large motor to draw in and expel air from the air cleaner.

In accordance with yet another object of the present invention, the discharge of air is expelled by outwardly radiating vanes which reduce pressure drop and noise during operation.

In accordance with another object of the present invention, the vanes are specially designed to reduce noise during and have improved air withdrawal efficiencies.

In accordance with still another object of the present invention, one or more of the vanes are not symmetrically oriented with respect to one another.

In accordance with another object of the present invention, one or more of the vanes are not harmonically oriented and/or shaped with respect to one or more of the other vanes.

In accordance with yet another object of the present invention, one or more of the vanes are not made of the same material with respect to one or more of the other vanes.

In accordance with still another object of the present invention, the air exhaust includes air guides to disperse filtered air from the air exhaust.

It is another object of the present invention to provide an air cleaner, wherein the discharge of air is generally radially outward from the entire periphery of the air cleaner housing so as to uniformly distribute the filtered air.

It is another object of the present invention to provide an air cleaner wherein air is drawn radially inwardly from the entire periphery of the unit near the base of the unit and the air is discharged outwardly about the entire periphery of the unit above the air intake.

In accordance with yet another object of the present invention, the air cleaner discharges filtered air without disturbing and/or causing settled particles to be recirculated in an environment.

It is still another object of the present invention to design a compact and portable air cleaner which can be easily moved to different rooms by a user.

These and other objects and advantages will become apparent to those skilled in the art upon reading the following description taken together with the accompanying drawings.

BRIEF DESCRIPTION OF THE DRAWINGS

Reference is now made to the drawings, which illustrate various embodiments that the invention may take in physical form and in certain parts and arrangement of parts herein.

PREFERRED EMBODIMENTS OF THE INVENTION

Figure 1:
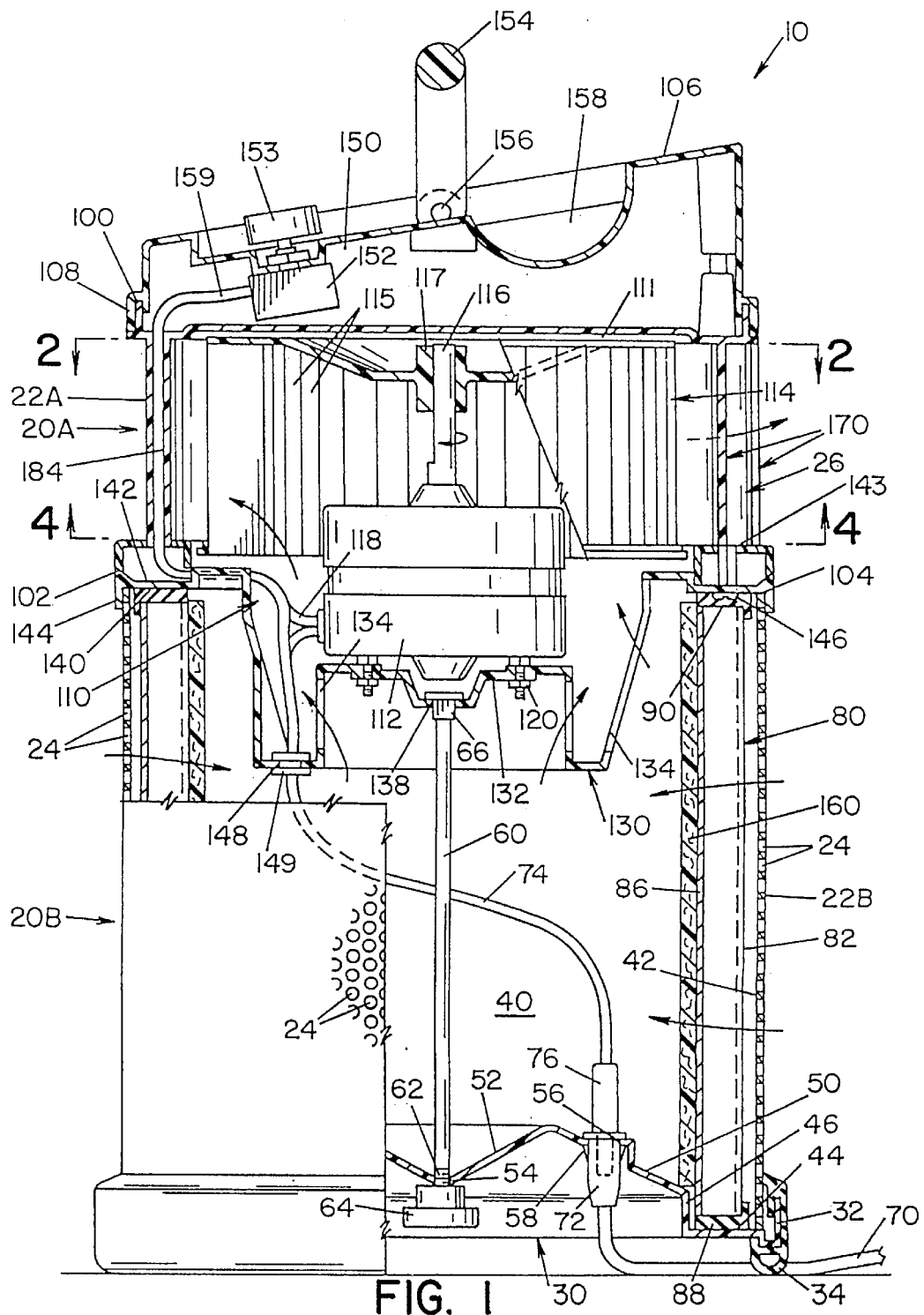
FIG. 1 is a cross-sectional view of the assembled air cleaner of the present invention.

Referring now to the drawings wherein the showings are for the purpose of illustrating the preferred embodiment of the invention only and not for the purpose of limiting the same, FIG. 1 illustrates a portable air cleaner 10. Air cleaner 10 includes a housing made up of an upper housing 20A and a lower housing 20B. Both the upper and lower housings are generally cylindrical. Lower housing peripheral surface 22B includes air intake 24. Air intake 24 is positioned about the complete peripheral surface of lower housing 20B and includes multiple holes or slots in peripheral surface 22B. The size of the slots or holes in air intake 24 are typically sized such that a user cannot insert his or her fingers into the slots or holes and damage the interior of air cleaner 10.

Air intake 24 is positioned on the lower part of air cleaner 10 so as to draw in unfiltered air at or near the base of air cleaner 10. Air cleaner 10 reduces and/or prevents the recirculation of settled particles by intaking unfiltered air at or near the base of air cleaner 10 and expelling the filtered air at or near the top of air cleaner 10. Many of the particles which are disturbed by the air flow into the air cleaner will be drawn into the air cleaner 10 and filtered by the air cleaner 10. The positioning of the air intake 24 about the complete peripheral surface of the lower housing 20B results in a larger surface area for unfiltered air to flow into the air cleaner 10, thereby resulting in a high volume of air drawn into the air cleaner 10 without creating high velocities of air into the air cleaner 10. The velocity reduction of the air into the air cleaner 10 reduces and/or prevents problems associated with disturbing settled particles about the air cleaner 10.

Mounted onto lower housing base 30 is a bumper 34. Bumper 34 is connected to the lower housing 20B by bumper leg 32 which is positioned outside of the peripheral surface 22B adjacent to base surface 44 as illustrated in FIG. 1. Bumper 34 is typically made of a plastic and/or rubber material which is designed to absorb vibration and noise, thereby providing for a quiet operation of air cleaner 10.

As shown in FIG. 1, upper housing 20A includes an upper housing peripheral surface 22A which incorporates air exhaust 26. Air exhaust 26 is positioned completely about the peripheral surface 22A. The air exhaust 26 includes a plurality of vanes 170 which function and design will be described in more detail below. The positioning of the air exhaust about the complete peripheral surface 22A of the upper housing 20A increases the surface area of the openings of the air exhaust 26 thereby allowing a large volume of air to be expelled from air cleaner 10 without creating high air velocities. As discussed above, high velocity air can cause settled particles to be inadvertently recirculated into a room. The positioning of air exhaust 26 on upper housing 20A distances the air exhaust 26 from the base of air cleaner 10 thereby significantly reducing the occurrences of filtered air exiting air cleaner 10 and disturbing particles which have settled on a floor surface near air cleaner 10.

Lower housing 20B includes an inner chamber 40. Inner chamber 40 is generally cylindrical in shape and has a generally uniform cross-sectional diameter along the longitudinal axis of the inner chamber. Inner chamber 40 includes a side wall 42 which defines the interior surface of air intake 24. The interior chamber also includes a base surface 44.

A filter ledge 46 is positioned on base surface 44 and is spaced from side wall 42. The filter ledge extends about base surface 44 of inner chamber 40. Filter ledge 46 is shown mounted to be generally perpendicular to base surface 44 and generally parallel to side wall 42.

Extending from the top of filter ledge 46 is air deflector 50. Air deflector 50 extends at some non-perpendicular angle from filter ledge 46 toward the interior of inner chamber 40. The air deflect also extends completely about the central axis of the inner chamber. The slope surface of air deflector 50 causes the air entering inner chamber 40 to be directed upwardly and toward air exhaust 26. Air deflector 50 extends into the interior of inner chamber 40 until it contacts motor support guide surface 52. Guide surface 52 extends toward the central axis of inner chamber 40 at a downward angle. Guide surface 52 extends uniformly about the central axis of inner chamber 40 thereby forming a conical surface near the central axis of inner chamber 40. Guide surface 52 is designed to guide threaded surface 62 of motor support 60 toward support hole 54 located at the central axis of inner chamber 40. As illustrated in FIG. 1, filter base surface 44, air deflector surface 50 and guide surface 52 define the complete base of lower housing 20B.

As best shown in FIG. 1, particle filter 80 is positioned between side wall 42 and filter ledge 46. Particle filter 80 is shown to be generally cylindrical and having a thickness which is less than or equal to the distance between side wall 42 and filter ledge 46. Filter ledge 46 maintains particle filter 80 in position so that the particle filter does not move as unfiltered air enters intake 24 and passes through particle filter 80. Particle filter 80 is positioned on top of filter support 88. The filter support 88 and the filter ledge 46 maintain the bottom edge of particle filter 80 in proper position with respect to the base of lower housing 20. Filter support 88 provides a small space between filter outer layer 82 and side wall 42. This small space ensures that particle filter 80 is not damaged during the operation of the air cleaner 10. Filter support 88 also acts as an air seal to prevent air from flowing under the particle filter 80 and into the interior of inner chamber 40 without being filtered.

At the top of particle filter 80 is a filter seal 90. This filter seal 90 works in conjunction with filter support 88 to maintain particle filter 80 in its proper position within inner chamber 40 throughout the longitudinal axis of the inner chamber. Filter seal 90 creates a small space between filter outer layer 82 and side wall 42. Filter seal 90 also prevents air from traveling about the top of particle filter 80 and into the interior inner chamber 40 without prior to being filtered.

Particle filter 80 is typically a HEPA filter which is designed to remove at least about 99.97% of particles entrained in the air which are about 0.3 micron in size. Preferably particle filter 80 removes at least about 99.98% of particles about 0.1 micron in size. The particle filter is typically suitable for use in high temperatures and high stress environments. Filter types which can be used are disclosed in Assignee's U.S. Pat. Nos. 5,248,323; 5,593,479; 5,641,343; 5,651,811; 5,837,020 and Assignee's U.S. patent application Ser. No. 09/032,589 filed Feb. 27, 1998.

As shown in FIG. 1, air cleaner 10 includes a gas filter 160 positioned coterminous to inner layer 86 of particle filter 80. Carbon filter 160 is typically cylindrical and is formed of a layer of non-woven activated charcoal matting. The activated charcoal is impregnated into the non-woven mat. The mat has a thickness of less than about 1 inch and is typically about 0.125–0.5 inch in thickness. The gas filter is designed to remove irritating and/or noxious gases which freely pass through particle filter 80. As can be appreciated, the gas filter can be made a part of the particle filter. Types of gas filters that can be used are disclosed in Assignee's U.S. Pat. Nos. 5,248,323; 5,593,479; 5,641,343; 5,651,811; 5,837,020 and Assignee's U.S. patent application Ser. No. 09/032,589 filed Feb. 27, 1998.

Referring again to FIG. 1, upper housing 20A includes a motor chamber 110. Motor chamber 110 includes a chamber top 111 which defines the top of the chamber. Within motor chamber 110 is positioned centrifugal fan 114. Centrifugal fan 114 has a plurality of fan blades 115. The centrifugal fan 114 includes a fan mount 117 which connects to motor shaft 116 of motor 112. Centrifugal fan 114 is designed to be rotated by motor 112 and to draw air into inner chamber 40 through air intake 24 and expel air through air exhaust 26. As the air is drawn from inner chamber 40, a vacuum is created within inner chamber 40 which causes the air outside of air cleaner 10 to be drawn through air intake 24 and through particle filter 80 and carbon filter 160. Motor 112 is typically an electric motor which is energized by electricity traveling through motor cord 74 and into motor 112 via motor power cord inlet 118. Motor cord 74 is connected to an external power source by motor cord connector 76 connecting to power cord connector 72 in cord connector hole 56 of air deflector surface 50 located at the housing base 30. Power cord connector 72 is secured in connection hole 56 by connector clip 58. The power cord 70 extends from power cord connector 72 to an electrical outlet thereby providing energy or electricity to motor 112.

The speed at which motor 112 is operated is controlled by switch 152 located in switch chamber 150. Switch chamber 150 is formed by top section 106. Top section 106 is shown to be mounted onto air exhaust top edge 100 at top section mounting surface 108. Switch 152 is mounted to switch chamber 150 by a nut arrangement or by some other mounting arrangement. Switch 152 includes a switch knob 153 which can be rotated by the user to vary the power to motor 112 via switch cord 159 to increase and/or decrease the motor speed. The motor typically includes an over heating reset circuit to temporarily shut off the motor when it overheats. Such overheating typically is caused by the insufficient flow of air through the air cleaner.

As illustrated in FIG. 1, motor 112 and centrifugal fan 114 are maintained in motor chamber 110 by motor guard 130. Motor 112 rests upon guard base 132 and is further supported by motor support 60 which extends from motor guard base 132 to housing base 30. Motor guard 130 includes a mount hole 138 which mounts motor support 60 to motor guard 130 by support mount 66. Motor support 60 extends through housing base 30 via support hole 54 in guide surface 52. Motor support 60 is secured at the housing base 30 by screwing on support knob 64 onto thread surface 62 of motor support 60. Motor 112 is energized by motor cord 74 which passes through cord access 148 of motor guard 130. Motor cord 74 is maintained in position in motor guard 130 by access plug 149.

Motor guard 130 is mounted to upper housing 20A by inserting guard connector 146 through mount hole 138. The guard connectors are typically screws and/or bolts. Motor guard 130 is connected to the base of motor 112 by nut and bolt arrangement 120. Motor guard 130 includes an air seal surface 140 which contacts filter seal 90 to form an air seal between upper housing 20A and lower housing 20B. Motor guard 130 also includes an upper housing seal surface 142 which seals bottom edge 102 of upper housing peripheral surface 22A with motor guard 130. Motor guard 130 further includes a lower housing seal surface 144 which is designed to be slidably engageable about lower housing peripheral surface 22B and air intake top edge 104. Sealing surfaces 142 and 144 on motor guard 130 effectively seal the upper housing 20A and lower housing 20B together when air cleaner 10 is fully assembled.

Motor guard 130 is designed to mount motor 112 into upper housing 20A as described above and to provide a sufficient air flow access from inner chamber 40 to motor chamber 110 so as to minimize the pressure drop between the two chambers. As illustrated in FIG. 1, a space exists between motor 112 and filters 80 and 160. The space allows the filtered air to flow between inner chamber 40 and motor chamber 110. Motor guard 130 is mounted between the space to prevent a user from freely accessing the motor and fan in the motor chamber. Air slots 134 are positioned throughout motor guard 130 to preferably provide a slot space surface area which is at least equal to the cross-sectional surface area of the space between motor 112 and filters 80 and 160. To increase the slot space surface area, motor guard 130 extends from the base of upper housing 20A into inner chamber 40 when the air cleaner 10 is fully assembled as shown in FIG. 1.

Figure 2:
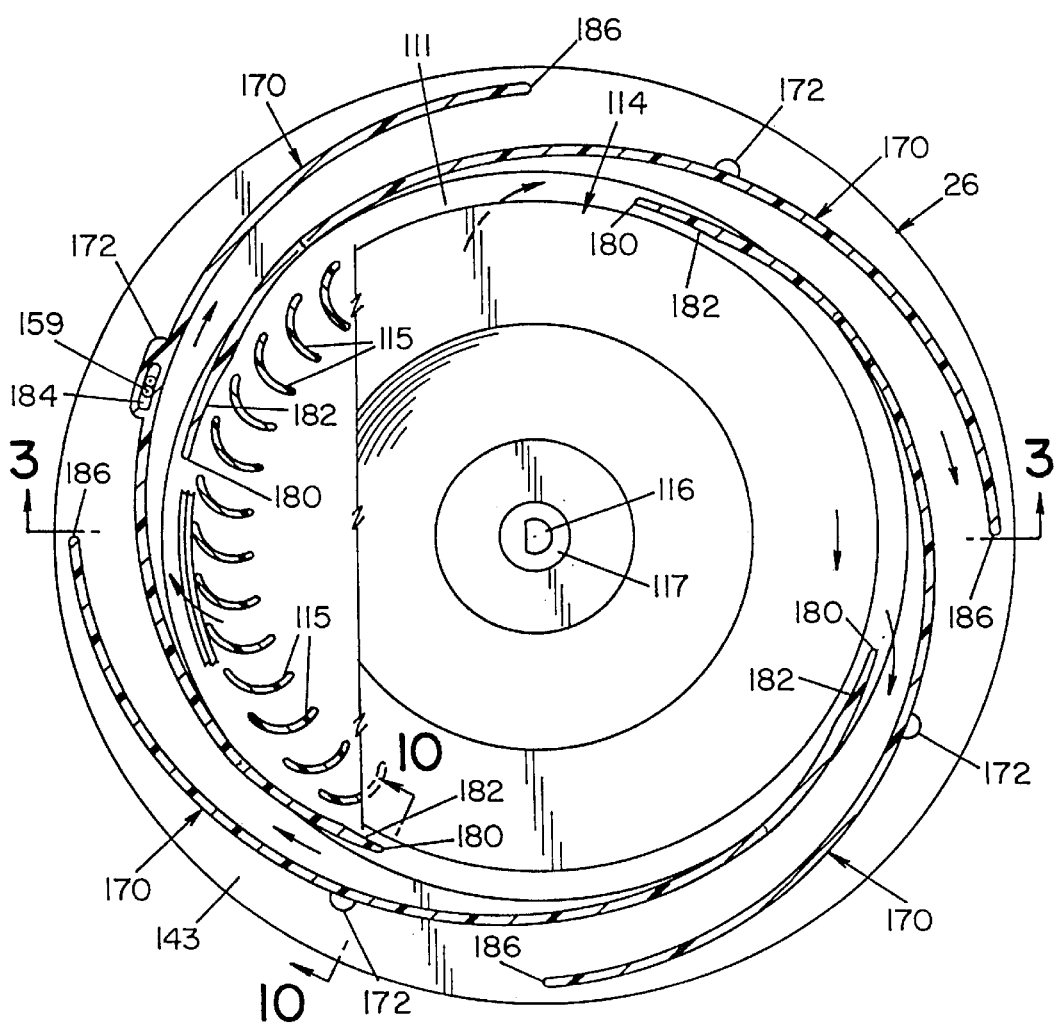
FIG. 2 is a cross-sectional view taken along line 2—2 of FIG. 1.
Figure 3:
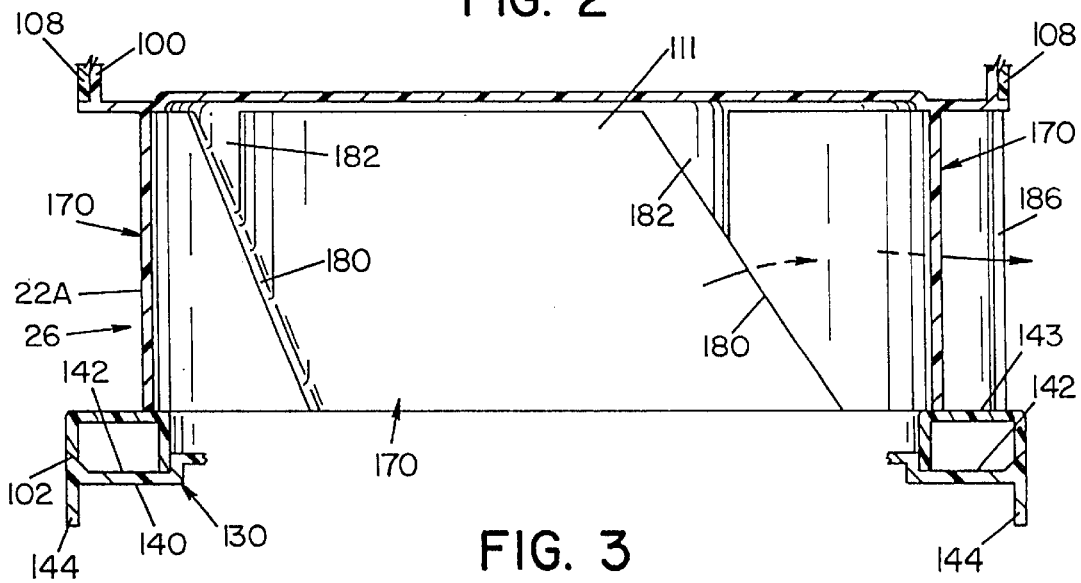
FIG. 3 is a cross-sectional view taken along line 3—3 of FIG. 2.

Referring now to FIGS. 2–12, there is illustrated, in detail, vanes 170 in air exhaust 26. As shown in FIGS. 2, 4, 4A, 4B and 12, air exhaust 26 includes a plurality of vanes 170 disposed about the perimeter of blade 115 of centrifugal fan 114. FIG. 2 illustrates four vanes 170 spaced about centrifugal fan 114. As can be appreciated, more or less vanes may be incorporated into the air exhaust depending on the diameter of the air exhaust. FIG. 2 illustrates a centrifugal fan 114 having a diameter of about 9–13 inches surrounded by four vanes 170 which radiate outwardly to form an air exhaust having a diameter of about 10–14 inches. Each vane is illustrated to be about 10–18 inches in length. As can be appreciated, the diameter of fan 114, and the dimensions of vanes 170 can be varied, depending on dimensional requirements. Each vane 170 includes a front end 180 and a back end 186. The front end of the vanes is positioned closest to blade 115 of centrifugal fan 114.

Figure 5:
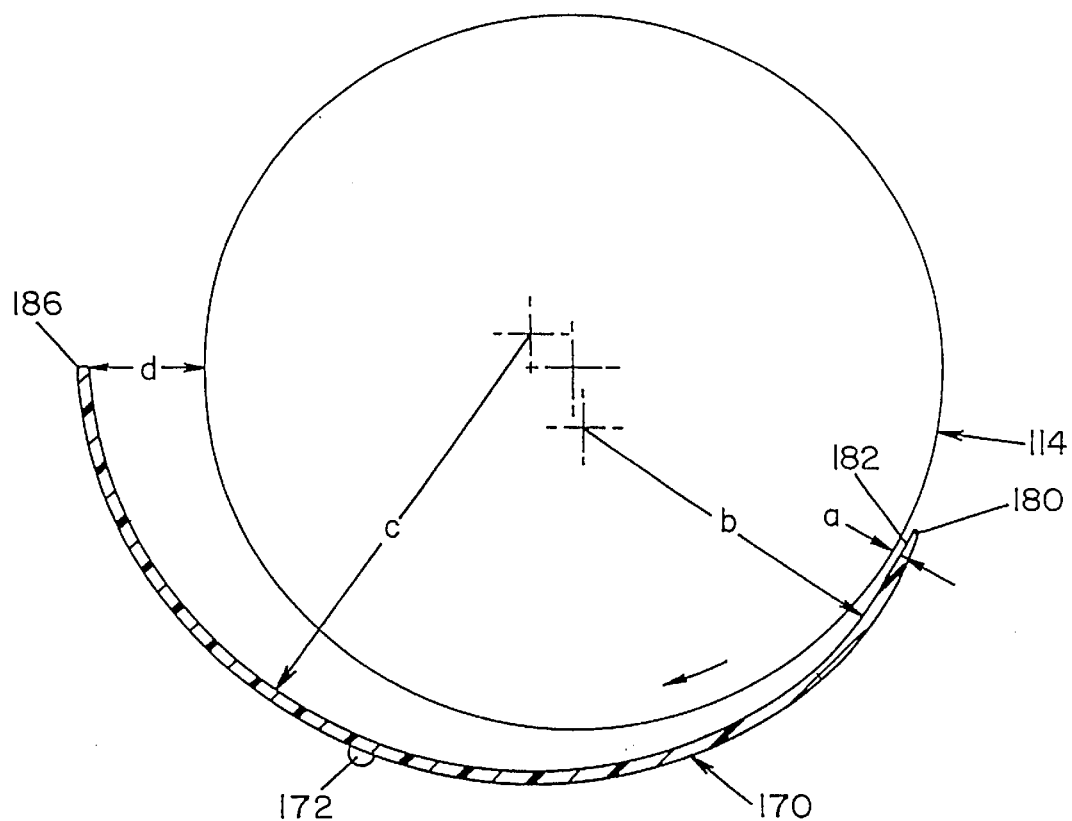
FIG. 5 is a modified view of FIG. 2 illustrating a single vane radiating outwardly from the center of the air cleaner of the present invention.
Figure 6:
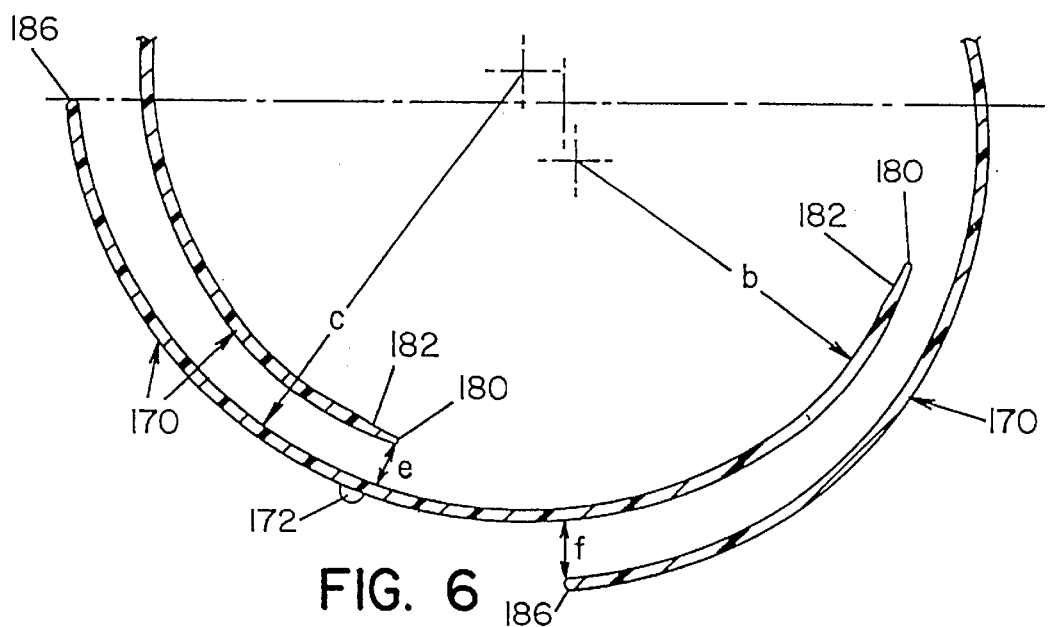
FIG. 6 is a top view of a plurality of vanes positioned about the center of the air cleaner of the present invention.

As best illustrated in FIGS. 5 and 6, the vanes have a varying radius of curvature from the front to back end. The radius of curvature at the front end of the vane is less than the radius of curvature at the back end of the vane. In addition, the center of curvature is positioned differently with respect to different sections of the vane. As a result, the vanes are substantially like volute shaped members positioned about the centrifugal fan 114. FIGS. 5 and 6 also illustrate the relative distances the vanes are positioned from one another and positioned from the centrifugal fan. Referring specifically to FIG. 5, distance a represents the distance vane front end 180 is positioned from centrifugal fan 114 and distance d represents the distance vane back end 186 is positioned from centrifugal fan 114. Distance a is less than distance d. Typically, distance a is less than about one inch and typically about 0.05 to 0.4 inch, and preferably about 0.125 to 0.25 inch from blade 115. A distance a of less than about 0.5 inch is typical for blade diameters of less than about 36 inches. Distance d is primarily dependent on the desired outer diameter of air exhaust 26. Typically, distance d ranges from about 1.0–2.5 inches for a blade having a diameter of about 5–20 inches. Distances b and c represent the radius of curvature of the vane. Distance b is shown to be less than distance c and each radius has a different center of curvature. For a vane of about 10–18 inches in length, distance b is about 3.58 inches and distance c is about 4.75–12 inches. As can be appreciated, different vane curvatures and lengths can be used to accommodate different air cleaner designs. However, the vane front end should be positioned closely to the centrifugal fan 114 to remove as much air from the blade of the centrifugal fan 114 as possible.

Referring now to FIG. 6, the relative space relationship of the vanes with respect to one another is illustrated. Distance e is the distance of vane front end 180 from an adjacently positioned vane and distance f is the distance of vane back end 186 from an adjacently positioned vane. The vanes are positioned about the centrifugal fan 114 such that distance f is greater than distance c. For vanes of about 10–18 inches, distance e is typically about 0.35–1.5 inches and distance f is typically about 0.5–2 inches; however, other distance relationships can be used. Distances e and f can be the same or different for two of more of the vanes positioned in the air exhaust.

Figure 4:
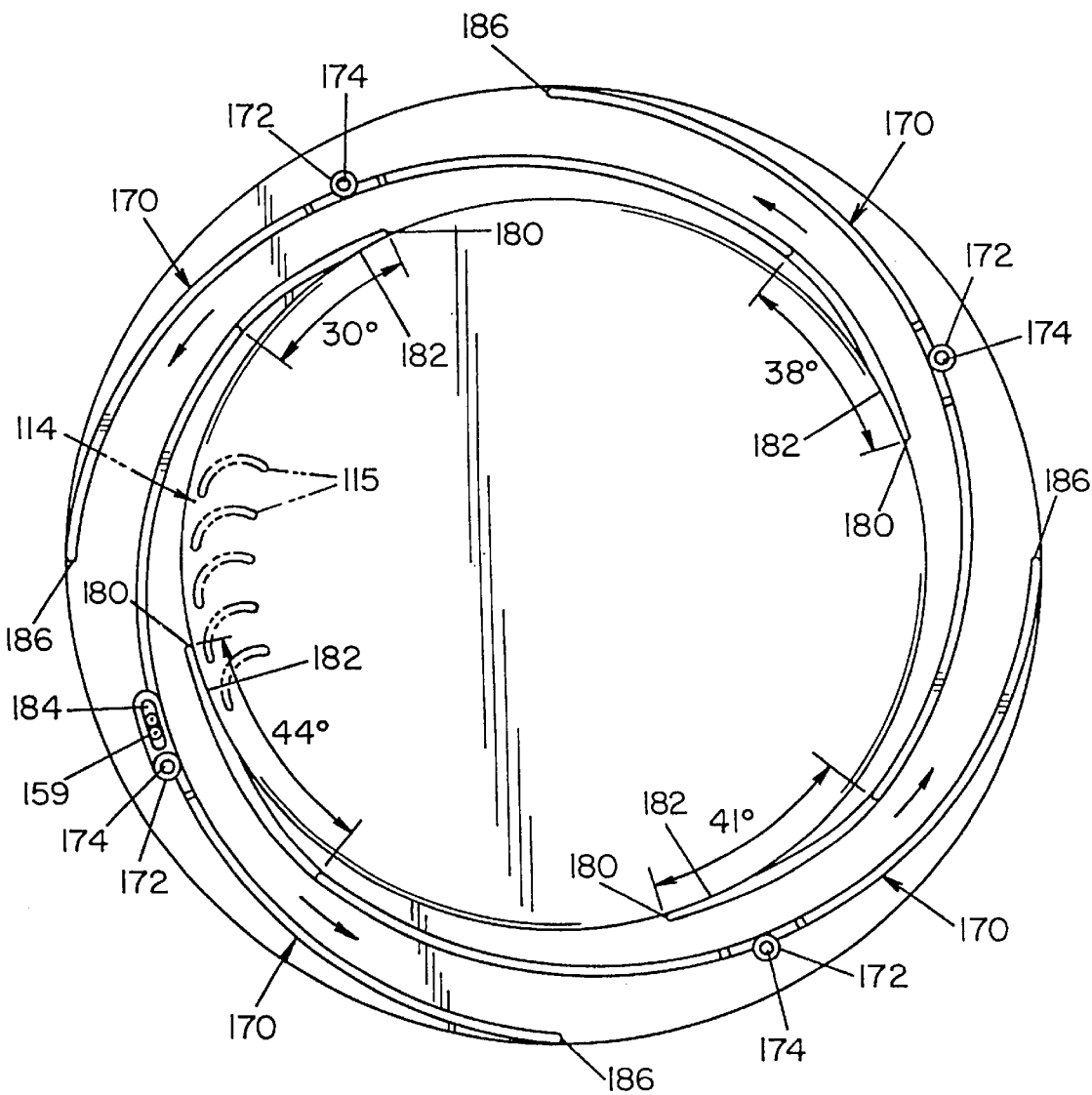
FIG. 4 is a cross-sectional view taken along line 4—4 of FIG. 2.

Referring now to FIGS. 2 and 4, vanes 170 are mounted onto vane mount surface 143 of the upper housing. Each vane 170 includes a plurality of mount holes 172 designed to receive a vane connector 174 to secure the vanes 170 to the upper housing and about centrifugal fan 114. At least one of vanes 170 includes a cord opening 184 to provide access for switch cord 159 as shown in FIG. 1. As illustrated in FIGS. 2 and 4, front end 180 of each vane 170 is spaced at substantially the same distance from blade 115. FIGS. 2 and 4 also illustrate that the front end of each vane 170 are not symmetrically oriented about blade 115 and that the front ends of the vanes 170 are not spaced at equal distances from the front ends of adjacently positioned vanes. As specifically shown in FIG. 4, the length of front end 180 of each vane is a different length. The length of the front end of the first vane is 30°. The length of the front end of the second vane is 38°. The length of the front end of the third vane is 41°. The length of the front end of the fourth vane is 44°. As a result of these front end vane lengths, the distance between the front ends of the forth vane and the first vane is about 81.75°; the distance between the front ends of the first vane and the second vane is about 89.75°; the distance between the front ends of the second vane and the third vane is about 92.75°; and the distance between the front ends of the third vane and the fourth vane is about 95.75°. Furthermore, FIGS. 2 and 4 illustrate that back end 186 of each vane is symmetrically oriented about the peripheral edge of the air exhaust and that the back ends of the vanes are spaced at substantially equal distances from the back ends of adjacently positioned vanes. In this vane configuration, the length of all the vanes is different. FIGS. 2 and 4 also illustrate that the radius of curvature of each vane from mount holes 172 to the back ends are substantially the same for each vane, and that the radius of curvature of each vane is different from the front end to mount holes 172. The unsymmetrical design of the vanes in the air exhaust counters any harmonic vibration of the vanes during the operation of the air cleaner.

Figure 9:
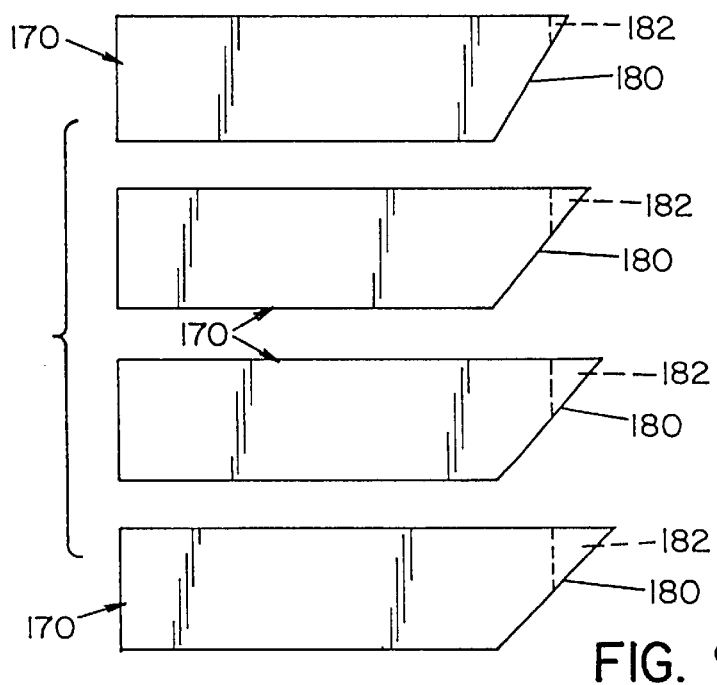
FIG. 9 is a sectional view of another alternative design of the leading end of the vanes in the air cleaner.
Figure 11:
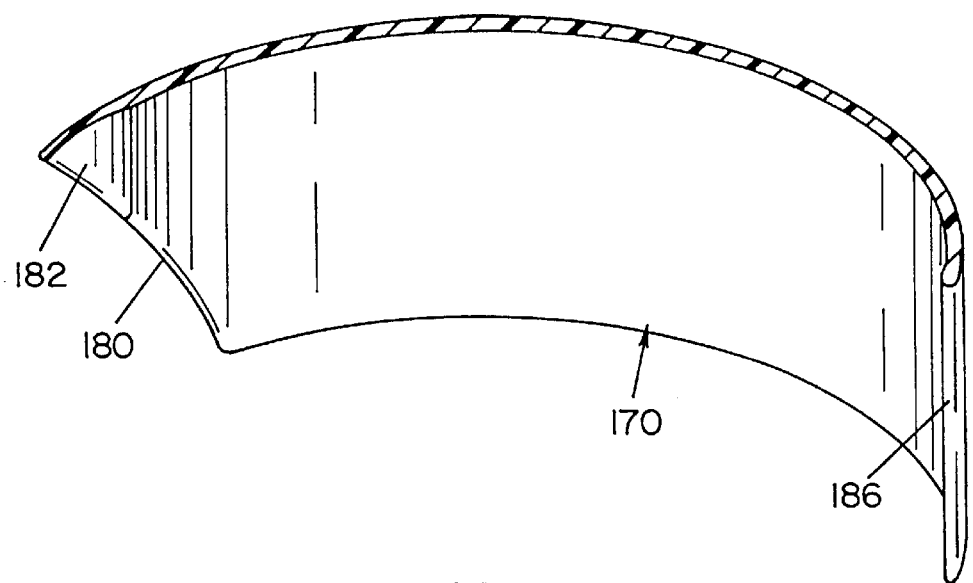
FIG. 11 is a perspective view of a single vane.

A linear form of the four vanes of FIGS. 2 and 4 prior to being mounted in the air exhaust is illustrated in FIG. 9. The length of each vane is different. In addition, the angle of the sloped surface of the front end of each vane is also different. Furthermore, the length and profile of tapered edge 182 of each vane is also different. As best shown in FIG. 6, vane front end 180 includes a tapered edge 182. Tapered edge 182 is designed further to reduce whistling noise and vibration noise as the filtered air is drawn off of centrifugal fan 114 by vanes 170. Typically, the tapered edge 182 is a smooth, curved surface. FIG. 11 illustrates the profile of one of the curved vanes of FIGS. 2 and 4.

Figure 4A:
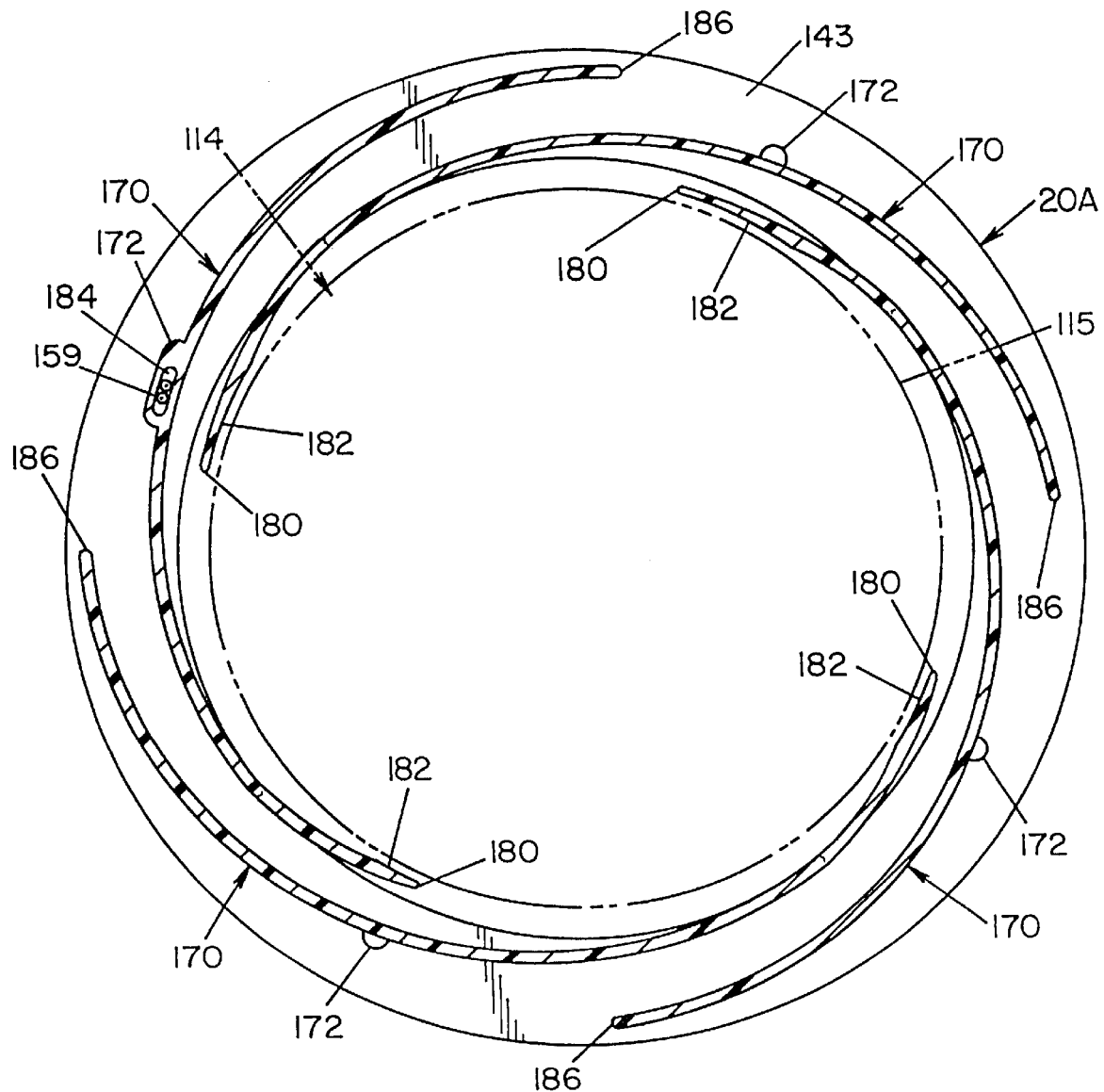
FIG. 4A is a cross-sectional view of an alternative vane arrangement taken along line 4—4 of FIG. 2.

Referring now to FIG. 4A, a modification to the vane design is illustrated. In FIG. 4A, vanes 170 are mounted onto vane mount surface 143 of the upper housing 20A in a similar fashion as shown in FIGS. 2 and 4. Also similar to FIGS. 2 and 4, front end 180 of each vane 170 as shown in FIG. 4A is spaced at substantially the same distance from blade 115. FIG. 4A, like FIGS. 2 and 4, shows the front end of each vane not symmetrically oriented about blade 115 and that the front ends of the vanes are not spaced at equal distances from the front ends of adjacently positioned vanes. Indeed, the spacing of the front end 180 of each vane from adjacent vanes is similar to the spacing illustrated in FIG. 4. However, the vanes in FIG. 4A are dissimilar to the vanes in FIGS. 2 and 4 in that the length of the vanes are substantially the same. As a result, the back end 186 of each vane 170 is not symmetrically oriented about the peripheral edge of the air exhaust 10 and that the back ends 186 of the vanes 170 are spaced at different distances from the back ends of adjacently positioned vanes. FIG. 4A also illustrates that the radius of curvature of each vane from mount holes 172 to the back ends 186 are different for each vane, and that the radius of curvature of each vane is different from the front end to mount holes 172. Similar to the vane design of FIGS. 2 and 4, the unsymmetrical design of the vanes in the air exhaust illustrated in FIG. 4A counters any harmonic vibration of the vanes during the operation of the air cleaner.

Figure 4B:
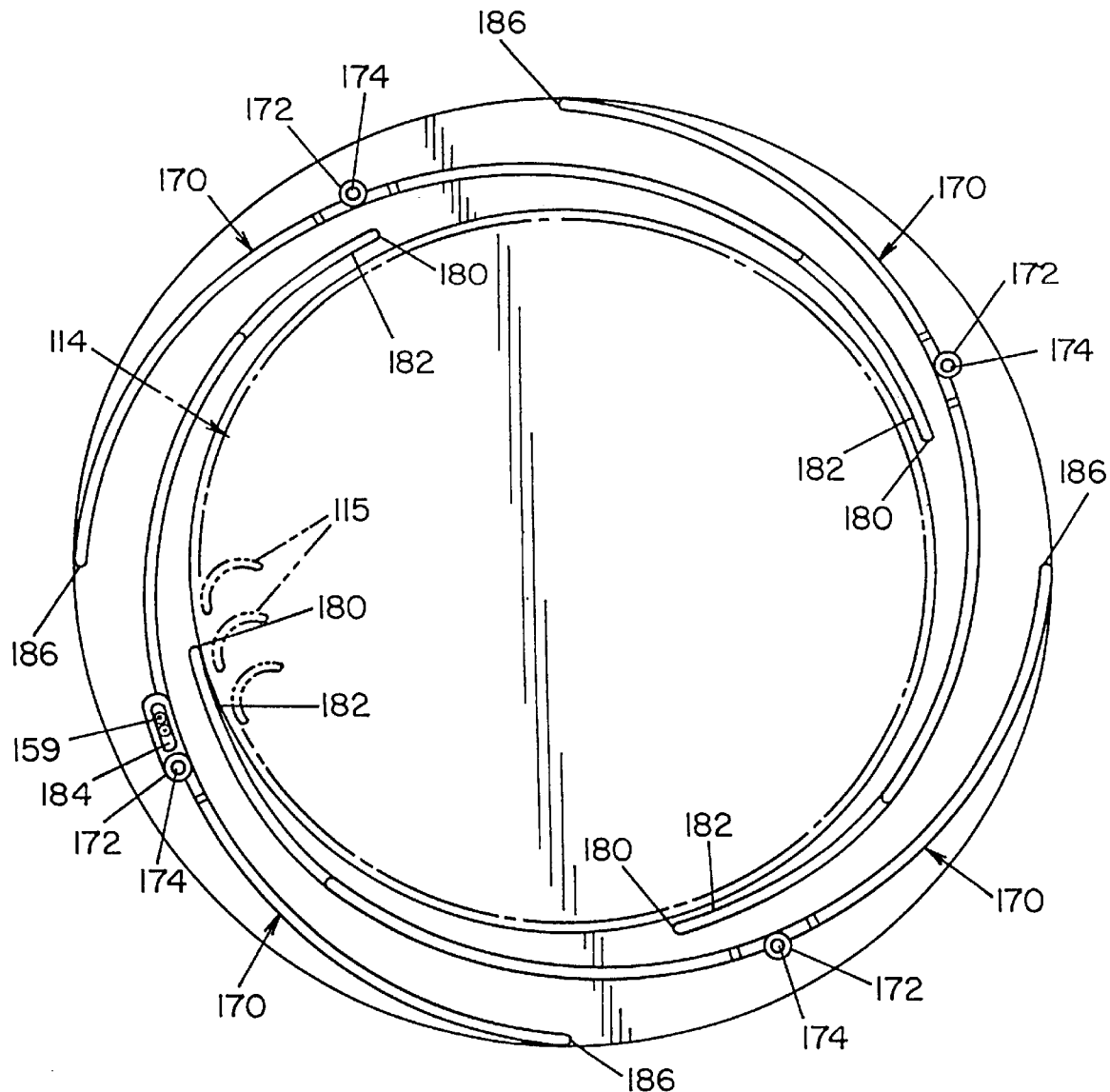
FIG. 4B is a cross-sectional view of another alternative vane arrangement taken along line 4—4 of FIG. 2.

Referring now to FIG. 4B, another modification to the vane design is illustrated. In FIG. 4B, vanes 170 are mounted onto vane mount surface 143 of the upper housing 20A in a similar fashion as shown in FIGS. 2 and 4. FIG. 4B, like FIGS. 2 and 4, shows the front end of each vane not symmetrically oriented about blade 115 and that the front ends of the vanes are not spaced at equal distances from the front ends of adjacently positioned vanes. Indeed, the spacing of the front end 180 of each vane from adjacent vanes is similar to the spacing illustrated in FIG. 4. Also similar to FIGS. 2 and 4, the vanes in FIG. 4B are dissimilar in length, the back end 186 of each vane is symmetrically oriented about the peripheral edge of the air exhaust 10 and the back ends of the vanes are spaced at substantially the same distances from the back ends of adjacently positioned vanes. FIG. 4B also illustrates that the radius of curvature of each vane from mount holes 172 to the back ends are the same for each vane, and that the radius of curvature of each vane is different from the front end to mount holes 172. However, the vane design illustrated in FIG. 4B is different from the vane design shown in FIGS. 2 and 4 in that front end 180 of each vane as shown in FIG. 4B is spaced at different distances from blade 115. Similar to the vane design of FIGS. 2 and 4, the unsymmetrical design of the vanes in the air exhaust illustrated in FIG. 4A counters any harmonic vibration of the vanes during the operation of the air cleaner.

Figure 7:
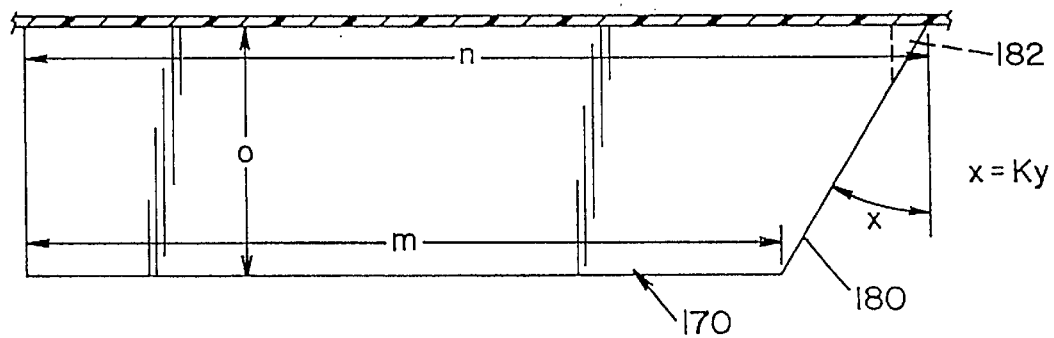
FIG. 7 is a sectional view of the leading end of a vane.
Figure 8:
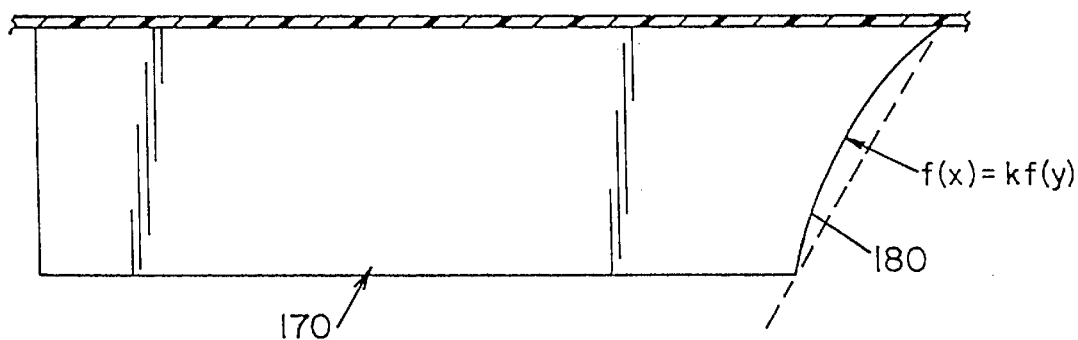
FIG. 8 is a sectional view of an alternative design of the leading end of a vane.

Referring now to FIGS. 3, 7, 8 and 9, vane front end 180 is a sloped surface which slopes downwardly from the top to the bottom of the vane. FIG. 7 illustrates the sloped surface as being a linear slope and FIG. 8 illustrates the sloped surface as being non-linear. The sloped surface functions to reduce noise during operation by eliminating a straight edged surface which typically causes a whistling noise as air passes the edge. The sloping of the vane front end reduces this noise generation. This allows the vane to be positioned closely to the centrifugal fan to draw off additional quantities of air without additional noise generation. The sloped surface also reduces the amount of vibration of the vane front end, thus further reducing noise generation and increasing air removal efficiencies. A slope angle of about 10–50 degrees, preferably about 20–40 degrees, and more preferably about 25–35 degrees results in the desired reduction in noise generation. If the slope is non-linear as shown in FIG. 8, the linear slope formed from the top and bottom ends of the vane, as represented by the dashed line, preferably has an angle of 10–50 degrees. One example of a vane which includes these enhanced features is a vane wherein distance m is about 13–14 inches, distance n is 15.25–16 inches, distance o is 3.5–4.25 inches and angle x is 20–40 degrees.

Figure 10:
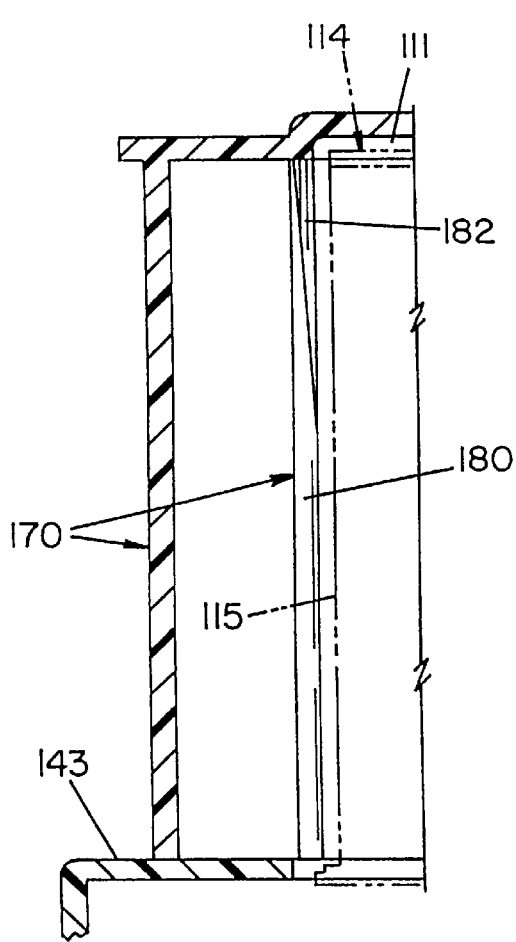
FIG. 10 is a cross-sectional view taken along line 10—10 of FIG. 2.
Figure 10A:
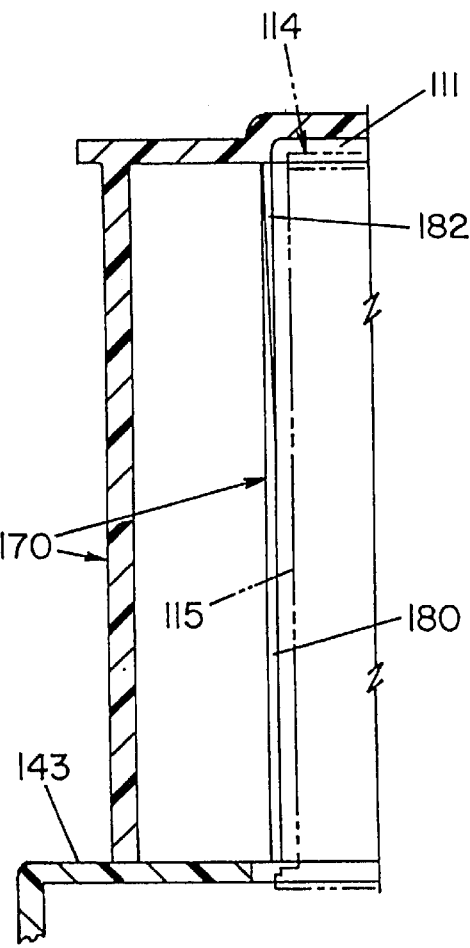
FIG. 10A is an alternative cross-sectional view taken along line 10—10 of FIG. 2.

Referring now to FIG. 10, the vane front end 180 of one of the vanes of FIGS. 2 and 4 is illustrated. The vane front end is spaced closely adjacent to blade 115 of centrifugal fan 114. Tapered end 182 tapers slightly away from blade 115. A modification to the vane front end is illustrated in FIG. 10A. The thickness of vane front end 180 is shown to be less than the thickness of vane front end 180 of FIG. 10. The harmonics of the vanes in the air exhaust can be countered by using vanes with different vane front end thicknesses as shown in FIGS. 10 and 10A.

Figure 12:
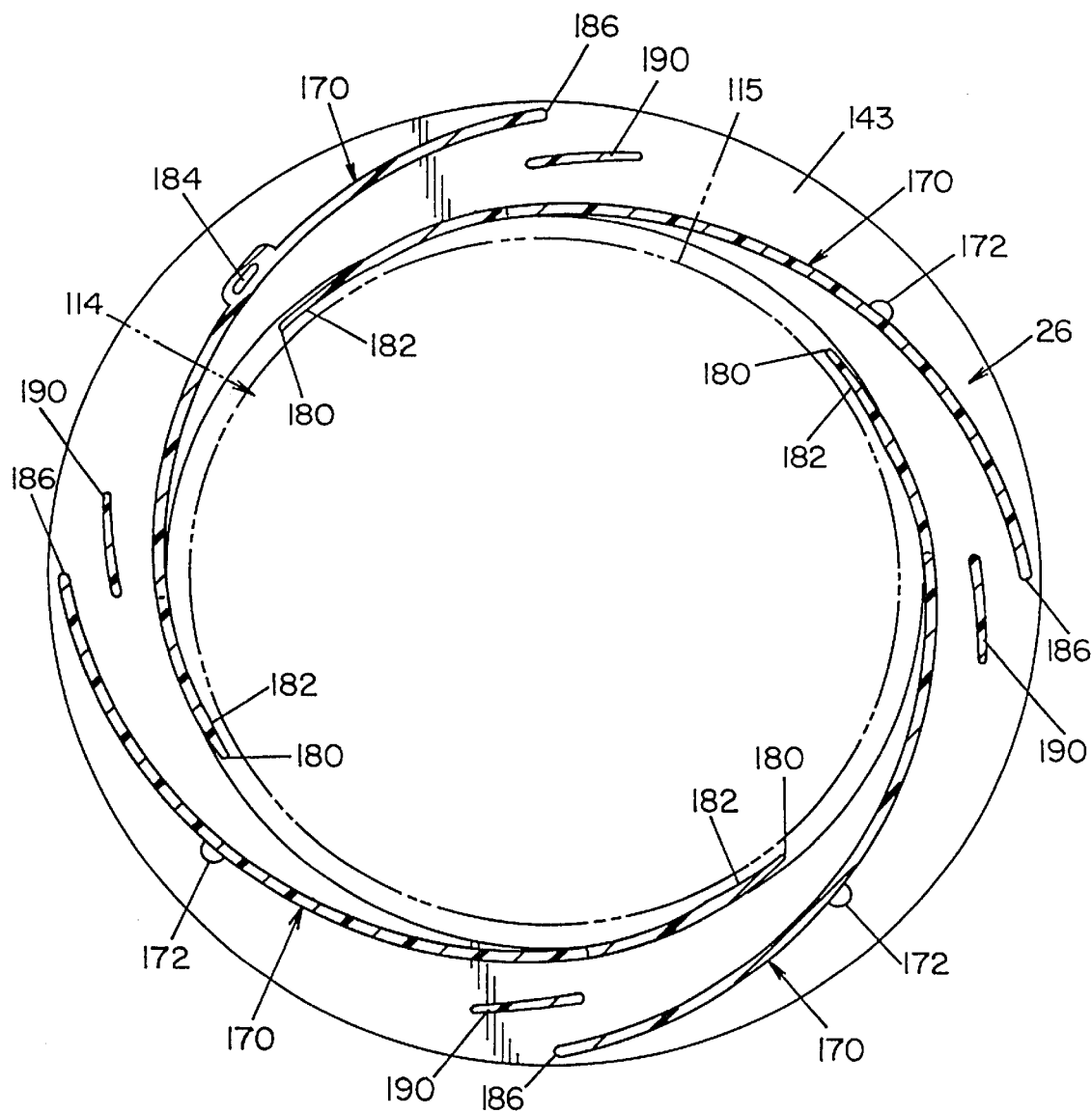
FIG. 12 is a modified view of FIG. 2 illustrating the use of air guides.

Another modification of air exhaust 26 is illustrated in FIG. 12. An air guide 190 is positioned between two vanes 170. The air guide 190 is typically positioned at a substantially equal distance from adjacently positioned vanes and typically positioned near vane back end 186. However, the air guides can be non-uniformly positioned between the vanes and positioned at differing locations relative to the vane back ends. The air guide typically has a height substantially equal to the adjacently positioned vanes but its length is substantially shorter than vanes 170. For vanes of about 10–18 inches, the air guide is typically about 1–4 inches; however, other lengths may be used. The air guide 190 can include tapered ends and/or be curved along its longitudinal length. The air guide 190 is designed to assist in directing the flow of air being expelled from air exhaust 26. As the expelled air travels along the inner surface of each vane, the air may tend to follow a single narrow path, thus resulting in relatively higher velocities when leaving the air exhaust. The air guide is designed to break up this narrow air path and force the air to flow out in a less narrow path from the vanes. This wider path of air flow reduces air velocities from the vanes without impairing air flow which could cause increased pressure drop. For relatively wide spaced vanes, multiple air guides may be used to redirect air flow. The air guides also serve as a secondary function to limit access to the interior of the air exhaust.

The specially designed air exhaust significantly reduces the pressure drop between the centrifugal fan and the exterior of the air exhaust. This significant pressure drop reduction allows for small motors to be used or smaller air exhaust surface areas for similar sized motors to be used. The vane design also provides for quieter operation. The sloped surfaces and/or tapered edges reduces vibration frequencies which can cause added noise during operation. The unsymmetrical design and/or orientation of the vanes reduces the harmonics of the vanes during operation, thus reducing vibration and vibrational noise of the vanes during operation. The unique vane design used in the air exhaust can also remove the same volume of air at 20–25% fan speed as compared to standard mesh design air exhausts running at 100% fan speed.

Referring now to FIG. 1, a handle 154 is mounted onto top section 106 so that a user can conveniently move air cleaner 10 to various locations within a room or building. Handle 154 is mounted to top section 106 by handle mount 156 which allows handle 154 to pivot on top section 106. A handle slot 158 is provided in top section 106 such that the handle may be pivoted downwardly into the slot to maintain the handle in a secure position.

The steps of changing particle filter 80 and/or gas filter 160 will now be described. Air cleaner 10 is designed such that the filters within the air cleaner 10 can be conveniently and easily removed and replaced to ensure that the air filters are properly removing particles and gases entrained in the air at the desired efficiency. As discussed above, an operator activates air cleaner 10 by rotating switch knob 153 on switch 152 the "on" position thereby energizing motor 112 which in turn causes centrifugal fan 114 to rotate. The speed of rotation of centrifugal fan 114 may be adjusted by switch 152. Air cleaner 10 is turned off when the operator turns the rotating switch knob 153 to the "off" position. The filters within air cleaner 10 can be easily removed by the operator by simply tilting the air cleaner 10 on its side and removing support knob 64 from threaded surface 62 of motor support 60. Once support knob 64 has been removed from motor support 60, air cleaner 10 is tilted back upon its base. Upper housing 20A is then separated from lower housing 20B by the operator grasping handle 154 and raising upper housing 20A from lower housing 20B. Raising upper housing 20A causes threaded surface 62 of motor support 60 to retract through support hole 54. The upper housing 20A is completely removed from the lower housing 20B by the operator reaching into inner chamber 40 and disengaging motor cord connector 76 from power card connector 72.

Once upper housing 20A is removed from lower housing 20B, particle filter 80 and gas filter 160 are easily removed from inner chamber 40 by lifting the two filters out of the inner chamber 40. A new particle filter 80 can then be reinserted into inner chamber 40 and set into base surface 44 at housing base 30. Gas filter 160 can then be inserted within particle filter 80 and coterminous to filter inner layer 86 as illustrated in FIG. 1. Once the filters have been properly inserted into inner chamber 40, upper housing 20A is replaced on lower housing 22B. As upper housing 20A is partially lowered onto lower housing 20B, the operator is able to reconnect motor cord connector 76 with power connector 72. The upper housing 20A is then fully lowered onto lower housing 20B . Threaded surface 62 of motor support 60 is easily guided into support hole 54 by guide surface 52. Once threaded surface 62 has been inserted through support hole 54 and the lower housing sealing surface 144 of motor guard 130 are engaged about the peripheral surface 22B near air intake top edge 104, support knob 64 is again rethreaded onto threaded surface 62 of motor support 60. The threading of support knob 64 secures the upper housing and lower housing together.

The invention has been described with reference to a preferred embodiment and alternates thereof. It is believed that many modifications and alterations of the embodiments disclosed will readily suggest themselves to those skilled in the art upon reading and understanding the detailed description of the invention. It is intended to include all such modifications and alterations insofar as they come within the scope of the present invention.

Having thus defined the invention, the following is claimed:

1. A portable air cleaner that generates less vibrational noise during operation comprising a housing having an outer peripheral edge and an inner chamber, an air intake, air exhaust that provides a passageway for the expulsion of air from said inner chamber, a blower having a blade to draw air into said inner chamber through said air intake and to expel air from said inner chamber through said air exhaust, a filter disposed between said air intake and air exhaust to at least partially filter air drawn through said air intake, the improvement comprising said air exhaust having a plurality of arcuate vanes radiating outwardly from said blower, at least a portion of two of said arcuate vanes positioned non-symmetrically relative to said blade, said at least two of said arcuate vanes directing said air from said blade in a substantially unobstructed manner to said outer peripheral edge of said housing.

2. The air cleaner as defined in claim 1, wherein each of said arcuate vanes having a length, at least one of said arcuate vanes having a length that is different from the length of at least one other arcuate vane.

3. The air cleaner as defined in claim 2, wherein each of said arcuate vanes has a different length.

4. The air cleaner as defined in claim 1, wherein each of said arcuate vanes has a radius of curvature over at least a portion of the length of said arcuate vane, at least one of said arcuate vanes having a radius of curvature that is different from the radius of curvature of at least one other arcuate vane.

5. The air cleaner as defined in claim 2, wherein each of said arcuate vanes has a radius of curvature over at least a portion of the length of said arcuate vane, at least one of said arcuate vanes having a radius of curvature that is different from the radius of curvature of at least one other arcuate vane.

6. The air cleaner as defined in claim 3, wherein each of said arcuate vanes has a radius of curvature over at least a portion of the length of said arcuate vane, at least one of said arcuate vanes having a radius of curvature that is different from the radius of curvature of at least one other arcuate vane.

7. The air cleaner as defined in claim 4, wherein each of said arcuate vanes has a different radius of curvature.

8. The air cleaner as defined in claim 6, wherein each of said arcuate vanes has a different radius of curvature.

9. The air cleaner as defined in claim 1, wherein at least two of said arcuate vanes having two ends, said first end positioned closely adjacent to said blade and said second end positioned at least closely adjacent to said outer peripheral edge of said housing, at least one of said arcuate vanes having a first end spaced closer to said blade than the first end of at least one other arcuate.

10. The air cleaner as defined in claim 2, wherein at least two of said arcuate vanes having two ends, said first end positioned closely adjacent to said blade and said second end positioned at least closely adjacent to said outer peripheral edge of said housing, at least one of said arcuate vanes having a first end spaced closer to said blade than the first end of at least one other arcuate.

11. The air cleaner as defined in claim 4, wherein at least two of said arcuate vanes having two ends, said first end positioned closely adjacent to said blade and said second end positioned at least closely adjacent to said outer peripheral edge of said housing, at least one of said arcuate vanes having a first end spaced closer to said blade than the first end of at least one other arcuate.

12. The air cleaner as defined in claim 8, wherein at least-two of said arcuate vanes having two ends, said first end positioned closely adjacent to said blade and said second end positioned at least closely adjacent to said outer peripheral edge of said housing, at least one of said arcuate vanes having a first end spaced closer to said blade than the first end of at least one other arcuate.

13. The air cleaner as defined in claim 9, wherein the first end of each of said arcuate vanes is spaced from said blade a different distance.

14. The air cleaner as defined in claim 12, wherein the first end of each of said arcuate vanes is spaced from said blade a different distance.

15. The air cleaner as defined in claim 1, wherein at least two of said arcuate vanes having two ends, said first end positioned closely adjacent to said blade and said second end positioned at least closely adjacent to said outer peripheral edge of said housing, said first end of at least one of said arcuate vanes spaced a greater perimeter distance about said blade from the first end of an adjacent arcuate vane than the perimeter distance about said blade from the first end of another adjacent arcuate vane.

16. The air cleaner as defined in claim 2, wherein at least two of said arcuate vanes having two ends, said first end positioned closely adjacent to said blade and said second end positioned at least closely adjacent to said outer peripheral edge of said housing, said first end of at least one of said arcuate vanes spaced a greater perimeter distance about said blade from the first end of an adjacent arcuate vane than the perimeter distance about said blade from the first end of another adjacent arcuate vane.

17. The air cleaner as defined in claim 4, wherein at least two of said arcuate vanes having two ends, said first end positioned closely adjacent to said blade and said second end positioned at least closely adjacent to said outer peripheral edge of said housing, said first end of at least one of said arcuate vanes spaced a greater perimeter distance about said blade from the first end of an adjacent arcuate vane than the perimeter distance about said blade from the first end of another adjacent arcuate vane.

18. The air cleaner as defined in claim 9, wherein said first end of at least one of said arcuate vanes spaced a greater perimeter distance about said blade from the first end of an adjacent arcuate vane than the perimeter distance about said blade from the first end of another adjacent arcuate vane.

19. The air cleaner as defined in claim 14, wherein said first end of at least one of said arcuate vanes spaced a greater perimeter distance about said blade from the first end of an adjacent arcuate vane than the perimeter distance about said blade from the first end of another adjacent arcuate vane.

20. The air cleaner as defined in claim 18, wherein said first end of each arcuate vane being spaced a different perimeter distance about said blade from the first end of an adjacent arcuate vane.

21. The air cleaner as defined in claim 19, wherein said first end of each arcuate vane being spaced a different perimeter distance about said blade from the first end of an adjacent arcuate vane.

22. The air cleaner as defined in claim 1, wherein at least two of said arcuate vanes having two ends, said first end positioned closely adjacent to said blade and said second end positioned at least closely adjacent to said outer peripheral edge of said housing, said first end of each vane has an end region, said end region of at least one of said arcuate vanes has a greater thickness than the thickness of the end region of at least one other arcuate vane.

23. The air cleaner as defined in claim 2, wherein at least two of said arcuate vanes having two ends, said first end positioned closely adjacent to said blade and said second end positioned at least closely adjacent to said outer peripheral edge of said housing, said first end of each vane has an end region, said end region of at least one of said arcuate vanes has a greater thickness than the thickness of the end region of at least one other arcuate vane.

24. The air cleaner as defined in claim 4, wherein at least two of said arcuate vanes having two ends, said first end positioned closely adjacent to said blade and said second end positioned at least closely adjacent to said outer peripheral edge of said housing, said first end of each vane has an end region, said end region of at least one of said arcuate vanes has a greater thickness than the thickness of the end region of at least one other arcuate vane.

25. The air cleaner as defined in claim 9, wherein at least two of said arcuate vanes having two ends, said first end positioned closely adjacent to said blade and said second end positioned at least closely adjacent to said outer peripheral edge of said housing, said first end of each vane has an end region, said end region of at least one of said arcuate vanes has a greater thickness than the thickness of the end region of at least one other arcuate vane.

26. The air cleaner as defined in claim 15, wherein said first end of each vane has an end region, said end region of at least one of said arcuate vanes has a greater thickness than the thickness of the end region of at least one other arcuate vane.

27. The air cleaner as defined in claim 21, wherein said first end of each vane has an end region, said end region of at least one of said arcuate vanes has a greater thickness than the thickness of the end region of at least one other arcuate vane.

28. The air cleaner as defined in claim 22, wherein the thickness of said end region of each of said arcuate vanes is different.

29. The air cleaner as defined in claim 27, wherein the thickness of said end region of each of said arcuate vanes is different.

30. The air cleaner as defined in claim 1, wherein at least one of said vanes overlaps at least a portion of an adjacently positioned vane.

31. The air cleaner as defined in claim 1, wherein said blade includes an axis of rotation, at least two of said arcuate vanes having two ends, said first end positioned closely adjacent to said blade and said second end positioned at least closely adjacent to said outer peripheral edge of said housing, said first end of at least one of said arcuate vanes including a front face having a sloped surface along at least a portion of said first end, said sloped surface have an angle that is nonparallel to said axis of rotation of said blade.

32. The air cleaner as defined in claim 1, wherein said blade includes an axis of rotation, at least two of said arcuate vanes having two ends, said first end positioned closely adjacent to said blade and said second end positioned at least closely adjacent to said outer peripheral edge of said housing, said front face of said first end of each of said arcuate vanes having an angle that is nonparallel to said axis of rotation of said blade, said angle on said front face of said first end of at least one arcuate vanes being different from said angle on said front face of said first end of at least one other arcuate vane.

33. The air cleaner as defined in claim 2, wherein said blade includes an axis of rotation, at least two of said arcuate vanes having two ends, said first end positioned closely adjacent to said blade and said second end positioned at least closely adjacent to said outer peripheral edge of said housing, said front face of said first end of each of said arcuate vanes having an angle that is nonparallel to said axis of rotation of said blade, said angle on said front face of said first end of at least one arcuate vanes being different from said angle on said front face of said first end of at least one other arcuate vane.

34. The air cleaner as defined in claim 4, wherein said blade includes an axis of rotation, at least two of said arcuate vanes having two ends, said first end positioned closely adjacent to said blade and said second end positioned at least closely adjacent to said outer peripheral edge of said housing, said front face of said first end of each of said arcuate vanes having an angle that is nonparallel to said axis of rotation of said blade, said angle on said front face of said first end of at least one arcuate vanes being different from said angle on said front face of said first end of at least one other arcuate vane.

35. The air cleaner as defined in claim 9, wherein said blade includes an axis of rotation, said front face of said first end of each of said arcuate vanes having an angle that is nonparallel to said axis of rotation of said blade, said angle on said front face of said first end of at least one arcuate vanes being different from said angle on said front face of said first end of at least one other arcuate vane.

36. The air cleaner as defined in claim 15, wherein said blade includes an axis of rotation, said front face of said first end of each of said arcuate vanes having an angle that is nonparallel to said axis of rotation of said blade, said angle on said front face of said first end of at least one arcuate vanes being different from said angle on said front face of said first end of at least one other arcuate vane.

37. The air cleaner as defined in claim 22, wherein said blade includes an axis of rotation, said front face of said first end of each of said arcuate vanes having an angle that is nonparallel to said axis of rotation of said blade, said angle on said front face of said first end of at least one arcuate vanes being different from said angle on said front face of said first end of at least one other arcuate vane.

38. The air cleaner as defined in claim 29, wherein said blade includes an axis of rotation, said front face of said first end of each of said arcuate vanes having an angle that is nonparallel to said axis of rotation of said blade, said angle on said front face of said first end of at least one arcuate vanes being different from said angle on said front face of said first end of at least one other arcuate vane.

39. The air cleaner as defined in claim 31, wherein said slope surface of at least one front face being substantially linear.

40. The air cleaner as defined in claim 39, wherein said slope surface of at least one front face being arcuate.

41. The air cleaner as defined in claim 1, wherein at least two of said arcuate vanes having two ends, said first end positioned closely adjacent to said blade and said second end positioned at least closely adjacent to said outer peripheral edge of said housing, said second end of at least one of said arcuate vanes spaced a greater perimeter distance about said outer peripheral edge from the second end on an adjacent arcuate vane than the perimeter distance about said outer peripheral edge from the second end of another adjacent arcuate vane.

42. The air cleaner as defined in claim 2, wherein at least two of said arcuate vanes having two ends, said first end positioned closely adjacent to said blade and said second end positioned at least closely adjacent to said outer peripheral edge of said housing, said second end of at least one of said arcuate vanes spaced a greater perimeter distance about said outer peripheral edge from the second end on an adjacent arcuate vane than the perimeter distance about said outer peripheral edge from the second end of another adjacent arcuate vane.

43. The air cleaner as defined in claim 4, least two of said arcuate vanes having two ends, said first end positioned closely adjacent to said blade and said second end positioned at least closely adjacent to said outer peripheral edge of said housing, wherein said second end of at least one of said arcuate vanes spaced a greater perimeter distance about said outer peripheral edge from the second end on an adjacent arcuate vane than the perimeter distance about said outer peripheral edge from the second end of another adjacent arcuate vane.

44. The air cleaner as defined in claim 9, wherein said second end of at least one of said arcuate vanes spaced a greater perimeter distance about said outer peripheral edge from the second end on an adjacent arcuate vane than the perimeter distance about said outer peripheral edge from the second end of another adjacent arcuate vane.

45. The air cleaner as defined in claim 15, wherein said second end of at least one of said arcuate vanes spaced a greater perimeter distance about said outer peripheral edge from the second end on an adjacent arcuate vane than the perimeter distance about said outer peripheral edge from the second end of another adjacent arcuate vane.

46. The air cleaner as defined in claim 22, wherein said second end of at least one of said arcuate vanes spaced a greater perimeter distance about said outer peripheral edge from the second end on an adjacent arcuate vane than the perimeter distance about said outer peripheral edge from the second end of another adjacent arcuate vane.

47. The air cleaner as defined in claim 32, wherein said second end of at least one of said arcuate vanes spaced a greater perimeter distance about said outer peripheral edge from the second end on an adjacent arcuate vane than the perimeter distance about said outer peripheral edge from the second end of another adjacent arcuate vane.

48. The air cleaner as defined in claim 29, wherein said second end of at least one of said arcuate vanes spaced a greater perimeter distance about said outer peripheral edge from the second end on an adjacent arcuate vane than the perimeter distance about said outer peripheral edge from the second end of another adjacent arcuate vane.

49. The air cleaner as defined in claim 41, wherein said second end of each arcuate vane being spaced a different perimeter distance about said outer peripheral edge from the second end of an adjacent arcuate vane.

50. The air cleaner as defined in claim 48, wherein said second end of each arcuate vane being spaced a different perimeter distance about said outer peripheral edge from the second end of an adjacent arcuate vane.

51. The air cleaner as defined in claim 1, wherein at least two of said arcuate vanes having two ends, said first end positioned closely adjacent to said blade and said second end positioned at least closely adjacent to said outer peripheral edge of said housing, said first end of at least one of said vanes being tapered.

52. The air cleaner as defined in claim 1, wherein at least two of said arcuate vanes having two ends, said first end positioned closely adjacent to said blade and said second end positioned at least closely adjacent to said outer peripheral edge of said housing, said first end of each vane being tapered, at least one vane having a different tapered end from the tapered end of at least one other vane.

53. The air cleaner as defined in claim 2, wherein at least two of said arcuate vanes having two ends, said first end positioned closely adjacent to said blade and said second end positioned at least closely adjacent to said outer peripheral edge of said housing, said first end of each vane being tapered, at least one vane having a different tapered end from the tapered end of at least one other vane.

54. The air cleaner as defined in claim 4, wherein at least two of said arcuate vanes having two ends, said first end positioned closely adjacent to said blade and said second end positioned at least closely adjacent to said outer peripheral edge of said housing, said first end of each vane being tapered, at least one vane having a different tapered end from the tapered end of at least one other vane.

55. The air cleaner as defined in claim 9, wherein said first end of each vane being tapered, at least one vane having a different tapered end from the tapered end of at least one other vane.

56. The air cleaner as defined in claim 15, wherein said first end of each vane being tapered, at least one vane having a different tapered end from the tapered end of at least one other vane.

57. The air cleaner as defined in claim 32, wherein said first end of each vane being tapered, at least one vane having a different tapered end from the tapered end of at least one other vane.

58. The air cleaner as defined in claim 41, wherein said first end of each vane being tapered, at least one vane having a different tapered end from the tapered end of at least one other vane.

59. The air cleaner as defined in claim 50, wherein said first end of each vane being tapered, at least one vane having a different tapered end from the tapered end of at least one other vane.

60. The air cleaner as defined in claim 1, including at least one air flow distributor positioned between at least two of said arcuate vanes.

61. The air cleaner as defined in claim 1, wherein said air intake and said air exhaust positioned substantially about the periphery of said housing.

62. The air cleaner as defined in claim 1, wherein said housing includes a lower section and an upper section, said air intake providing an air passageway through said lower section and into said inner chamber, said air exhaust providing an air passageway through said upper section for expelling air from said inner chamber.

63. The air cleaner as defined in claim 1, wherein said housing includes a lower section and an upper section, said upper section having an exterior surface, a bottom edge and an interior compartment; said lower section having a base, a top edge, an outer surface, an inner surface and an inner compartment; said lower and upper section connected together by a sealing arrangement which connects said upper section bottom edge to said lower section top edge, said lower section base includes a damper to reduce noise during operation of said blower, said damper including a material selected from the group consisting of rubber, plastic, foam and combinations thereof.

64. An air exhaust arrangement for a blower that generates less vibrational noise during operation comprising an outer peripheral edge, a blower, a blade rotatably connected to said blower, and a blower exhaust housing having an air passageway for the expulsion of air from said blower to the outer peripheral edge, said blower exhaust housing including a plurality of arcuate vanes radiating outwardly from said blade, each of said vanes having a length and two ends, each of said vanes having a radius of curvature over at least a section of said length of said vane, said first end of said vane positioned closer to said blade than said second end of said vane, said arcuate vanes directing said air in a substantially unobstructed manner to said outer peripheral edge, said second end of at least one vane extending to said outer peripheral edge of said housing, said arcuate vanes are positioned about said blade to reduce the amount of noise below about 20 KHz.

65. The air exhaust arrangement as defined in claim 64, wherein said arcuate vanes are positioned about said blade to reduce the amount of vibrational noise during operation of the blade.

66. The air exhaust arrangement as defined in claim 64, wherein said arcuate vanes are positioned about said blade non-symmetrically relative to said blade.

67. An air exhaust arrangement for a blower that generates less vibrational noise during operation comprising an outer peripheral edge, a blower, a blade rotatably connected to said blower, and a blower exhaust housing having an air passageway for the expulsion of air from said blower to said outer peripheral edge, said blower exhaust housing including a plurality of arcuate vanes radiating outwardly from said blade, each of said vanes having a length and two ends, each of said vanes having a radius of curvature over at least a section of said length of said vane, said first end of said vane positioned closer to said blade than said second end of said vane, said arcuate vanes directing said air in a substantially unobstructed manner to said outer peripheral edge, a plurality of said arcuate vanes being positioned about said blade non-symmetrically relative to said blade.

68. The air exhaust arrangement as defined in claim 67, wherein each of said arcuate vanes having a length, at least one of said arcuate vanes having a length that is different from the length of at least one other arcuate vane.

69. The air exhaust arrangement as defined in claim 67, wherein each of said arcuate vanes has a radius of curvature over at least a portion of the length of said arcuate vane, at least one of said arcuate vanes having a radius of curvature that is different from the radius of curvature of at least one other arcuate vane.

70. The air exhaust arrangement as defined in claim 67, wherein at least two of said arcuate vanes having two ends, said first end positioned closely adjacent to said blade and said second end positioned at least closely adjacent to said outer peripheral edge of said blower exhaust housing, at least one of said arcuate vanes having a first end spaced closer to said blade than said first end of at least one other arcuate vane.

71. The air exhaust arrangement as defined in claim 67, wherein at least two of said arcuate vanes having two ends, said first end positioned closely adjacent to said blade and said second end positioned at least closely adjacent to said outer peripheral edge of said blower exhaust housing, said first end of at least one of said arcuate vanes spaced a greater perimeter distance about said blade from said first end of an adjacent arcuate vane than the perimeter distance about said blade from said first end of another adjacent arcuate vane.

72. The air exhaust arrangement as defined in claim 71, wherein said first end of at least one of said arcuate vanes spaced a greater perimeter distance about said blade from said first end of an adjacent arcuate vane than said perimeter distance about said blade from said first end of another adjacent arcuate vane.

73. The air exhaust arrangement as defined in claim 67, wherein at least two of said arcuate vanes having two ends, said first end positioned closely adjacent to said blade and said second end positioned at least closely adjacent to said outer peripheral edge of said blower exhaust housing, said first end of each vane has an end region, said end region of at least one of said arcuate vanes has a greater thickness than the thickness of said end region of at least one other arcuate vane.

74. The air exhaust arrangement as defined in claim 67, wherein at least one of said vanes overlaps at least a portion of an adjacently positioned vane.

75. The air exhaust arrangement as defined in claim 67, wherein said blade includes an axis of rotation, at least two of said arcuate vanes having two ends, said first end positioned closely adjacent to said blade and said second end positioned at least closely adjacent to said outer peripheral edge of said blower exhaust housing, said first end of at least one of said arcuate vanes including a front face having a sloped surface along at least a portion of said first end, said sloped surface have an angle that is nonparallel to said axis of rotation of said blade.

76. The air exhaust arrangement as defined in claim 67, wherein said blade includes an axis of rotation, at least two of said arcuate vanes having two ends, said first end positioned closely adjacent to said blade and said second end positioned at least closely adjacent to said outer peripheral edge of said blower exhaust housing, said front face of said first end of each of said arcuate vanes having an angle that is nonparallel to said axis of rotation of said blade, said angle on said front face of said first end of at least one arcuate vane being different from said angle on said front face of said first end of at least one other arcuate vane.

77. The air exhaust arrangement as defined in claim 67, wherein at least two of said arcuate vanes having two ends, said first end positioned closely adjacent to said blade and said second end positioned at least closely adjacent to said outer peripheral edge of said blower exhaust housing, said second end of at least one of said arcuate vane spaced a greater perimeter distance about said outer peripheral edge from said second end on an adjacent arcuate vane than said perimeter distance about said outer peripheral edge from said second end of another adjacent arcuate vane.

78. The air exhaust arrangement as defined in claim 67, wherein at least two of said arcuate vanes having two ends, said first end positioned closely adjacent to said blade and said second end positioned at least closely adjacent to said outer peripheral edge of said blower exhaust housing, said first end of at least one of said vanes being tapered.

79. The air exhaust arrangement as defined in claim 67, including at least one air flow distributor positioned between at least two of said arcuate vanes.

\* \* \* \* \*